(12) United States Patent
Husain

(10) Patent No.: US 11,938,828 B2
(45) Date of Patent: Mar. 26, 2024

(54) CONTROLLING THE OPERATION OF A COMPONENT IN AN ELECTRIC VEHICLE

(71) Applicant: SPARKCOGNITION, INC., Austin, TX (US)

(72) Inventor: Syed Mohammad Amir Husain, Georgetown, TX (US)

(73) Assignee: SPARKCOGNITION, INC., Austin, TX (US)

( * ) Notice: Subject to any disclaimer, the term of this patent is extended or adjusted under 35 U.S.C. 154(b) by 5 days.

(21) Appl. No.: 17/580,405

(22) Filed: Jan. 20, 2022

(65) Prior Publication Data

US 2022/0227231 A1    Jul. 21, 2022

Related U.S. Application Data

(60) Provisional application No. 63/139,427, filed on Jan. 20, 2021.

(51) Int. Cl.
*B60L 3/00* (2019.01)
*B60L 50/16* (2019.01)
*B60L 58/16* (2019.01)

(52) U.S. Cl.
CPC ............. *B60L 3/0046* (2013.01); *B60L 58/16* (2019.02); *B60L 50/16* (2019.02); *B60L 2240/42* (2013.01); *B60L 2240/54* (2013.01)

(58) Field of Classification Search
CPC ........ B60L 3/0046; B60L 58/16; B60L 50/16; B60L 2240/42; B60L 2240/54
See application file for complete search history.

(56) References Cited

U.S. PATENT DOCUMENTS

| | | | |
|---|---|---|---|
| 5,089,762 A * | 2/1992 | Sloan | H02J 1/14 320/155 |
| 2018/0252567 A1* | 9/2018 | Buteau | G01M 15/044 |
| 2020/0043258 A1* | 2/2020 | Jiang | G07C 5/085 |

* cited by examiner

*Primary Examiner* — Jared Fureman
*Assistant Examiner* — Duc M Pham

(57) ABSTRACT

Controlling the operation of one or more components in an electric vehicle, including: receiving, from one or more vehicle operation sensors, operation data including sensor data corresponding to a condition of one or more components of the vehicle; determining, using a trained model, whether the one or more components of the vehicle are operating in an acceptable manner; and generating a control signal to adjust operation of the one or more components of the vehicle.

20 Claims, 12 Drawing Sheets

CONTROLLING THE OPERATION OF A COMPONENT IN AN ELECTRIC VEHICLE

CROSS-REFERENCE TO RELATED APPLICATION

This is a non-provisional application for patent entitled to a filing date and claiming the benefit of earlier-filed U.S. Provisional Patent Application No. 63/139,427, filed Jan. 20, 2021, herein incorporated by reference in its entirety.

DESCRIPTION OF EMBODIMENTS

Figure 1:
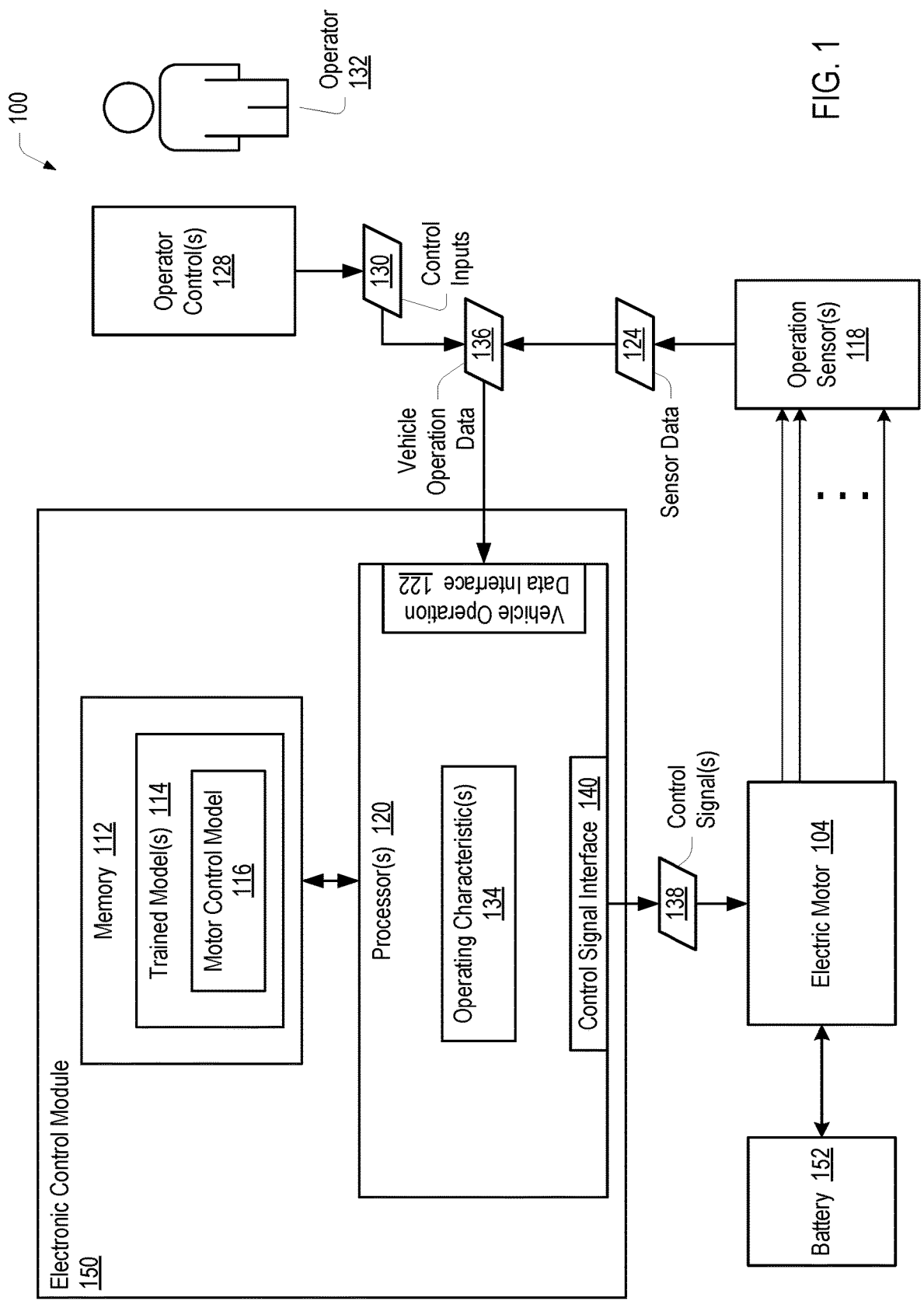
FIG. 1 illustrates a block diagram of a particular implementation of a vehicle that includes a motor control model to control operation of an electric motor in accordance with some examples of the present disclosure.

Example methods, apparatus, and products for controlling the operation of a component in an electric vehicle in accordance with embodiments of the present disclosure are described with reference to the accompanying drawings, beginning with FIG. 1. FIG. 1 depicts a system (100) that includes a vehicle (102) operated by an operator (132). The vehicle (102) depicted in FIG. 1 may be embodied, for example, as an electric vehicle that uses a combination of an electric motor and battery in place of a combustion engine and gasoline or diesel fuel. The vehicle (102) includes an electric motor (104), a battery (152), a memory (112), and one or more operator controls (128) that are coupled to one or more processors (120). Readers will appreciate that although only a single battery (152) is depicted for ease of explanation, multiple batteries may actually be included in the vehicle, including multiple batteries that are used for different purposes such as delivering power to the electric motor (104), delivering power to other components such as a display system, and so on. In various implementations, the vehicle (102) may be one or more of: an aircraft (e.g., an airplane or unmanned aerial vehicle), a watercraft (e.g., a ship or submarine), or a land vehicle (e.g., an automobile), as illustrative, non-limiting examples. In alternate implementations, the electronic control module (150), the electric motor (104), operation sensors (118), and operator controls (128) are part of a power generator or other non-transportation equipment.

The memory (112) in the vehicle (102) may be configured to store one or more trained models (114), including a motor control model (116). The motor control model (116) may be embodied, for example, as one or more modules of computer program instructions that, when executed, can impact the extent to which power is delivered to the electric motor (104) from the battery (152). The motor control model (116) may be configured, for example, to influence the manner in which power is delivered to the electric motor (104) from the battery (152) to improve the function or longevity of the battery (152), to influence the manner in which power is delivered to the electric motor (104) from the battery (152) to reduce wear on other parts of the vehicle (102) (e.g., the tires), to influence the manner in which power is delivered to the electric motor (104) from the battery (152) to alter the vehicle's (102) performance to adhere to a particular mode (e.g., a high performance mode, a comfort mode, an economical mode). The motor control (116), including the creation thereof through machine learning techniques, will be described in greater detail below.

The vehicle (102) depicted in FIG. 1 also includes one or more vehicle operation sensors (118) configured to generate sensor data (124) that may be used to create vehicle operation data (136). The vehicle operation data (136) can include sensor data (124) corresponding to a condition of the electric motor (104), sensor data (124) corresponding to a condition of the battery (152), control inputs (130) indicative of operation of the vehicle (102), or a combination thereof. The vehicle (102) also includes one or more processors (120) configured to determine, using the motor control model (116), an operating characteristic of the electric motor (104) at least partially based on the vehicle operation data (136) and to generate one or more control signals (138) to adjust operation of the electric motor (104) in accordance with the operating characteristics.

In some implementations, an apparatus for controlling an electric motor of a vehicle includes a memory configured to store one or more trained models, and the one or more trained models include a motor control model. The apparatus also includes one or more processors configured to receive vehicle operation data that includes sensor data corresponding to a condition of the electric motor, sensor data corresponding to a condition of one or more batteries, control inputs indicative of operation of the vehicle, or a combination thereof. The one or more processors are also configured to determine, using a trained motor control model, an operating characteristic of an electric motor at least partially based on the vehicle operation data, and to generate a control signal to adjust operation of the electric motor in accordance with the operating characteristic.

In some implementations, a computer-readable storage device stores instructions that, when executed by one or more processors, cause the one or more processors to receive vehicle operation data that includes sensor data corresponding to a condition of the electric motor, sensor data corresponding to a condition of one or more batteries, control inputs indicative of operation of the vehicle, or a combination thereof. The instructions further cause the one or more processors to determine, using a trained motor control model, an operating characteristic of an electric motor at least partially based on the vehicle operation data and to generate a control signal to adjust operation of the electric motor in accordance with the operating characteristic.

In the example depicted in FIG. 1, the vehicle (102) uses a trained motor control model (116) to control operation of the electric motor (104). In some implementations, the electric motor (104) may be tuned or controlled to achieve one or more operating characteristics, where, by contrast, an electric motor (104) that is controlled via a pedal or other driver control mechanism is unable to be similarly controlled to achieve the one or more operating characteristics.

In this example, the memory (112) and the one or more processors (120) are incorporated in an electronic control module (150) ("ECM") that is coupled to the electric motor (104) and to the one or more operator controls (128). In some implementations, the memory (112) includes volatile memory devices, non-volatile memory devices, or both, such as one or more hard drives, solid-state storage devices (e.g., flash memory, magnetic memory, or phase change memory), a random access memory (RAM), a read-only memory (ROM), one or more other types of storage devices, or any combination thereof.

In this example, the memory (112) stores data and instructions (e.g., computer code) that are executable by the one or more processors (120). For example, the instructions can include one or more trained models (114) (e.g., trained machine learning models) that are executable by the one or more processors (120) to initiate, perform, or control various operations of the vehicle (102). The one or more processors (120) include one or more single-core or multi-core central processing units (CPUs), one or more digital signal processors (DSPs), one or more graphics processing units (GPUs), or any combination thereof. Although the memory (112) and the one or more processors (120) are depicted within the electronic control module (150), in other implementations, one or both of the memory (112) and the one or more processors (120) may be external to the electronic control module (150).

In some implementations, the vehicle (102) includes one or more vehicle operation sensors (118) configured to generate sensor data (124) that may be, or is included as part of, vehicle operation data (136). In some examples, the vehicle operation data (136) may include sensor data (124) corresponding to a condition of the electric motor (104), including a condition of any components within the electric motor or coupled to the electric motor. Further, in some examples, the vehicle operation data (136) may, in addition to or instead of sensor data (124), include control inputs (130). In some examples, the control inputs (130) may be, or are included as part of, vehicle operation data (136), where the control inputs (130) may be generated via vehicle operation sensors (not depicted) coupled to the one or more operator controls (128) and indicative of operation of the vehicle (102).

Examples of sensor data (124) include various measurements corresponding to temperatures, pressures, motor speed, battery condition, air intake and exhaust flows, exhaust oxygen levels, one or more other measurements, or any combination thereof. Examples of the control inputs (130) includes data representing position and movement of one or more operator controls (128), such as from one or more sensor coupled to a throttle (e.g., an accelerator pedal), a brake pedal, a steering wheel, a traction control button, a ride height control, a cruise control, one or more other controls, or any combination thereof.

In some implementations, the memory (112) may be configured to store one or more trained models (114) that are executable by the one or more processors (120) to determine operating characteristics related to the vehicle (102) based on various sensor and control inputs. For example, the one or more trained models (114) may include neural networks, classifiers, regression models, or other types of models, such as described further with reference to FIG. 5. As illustrated, the one or more trained models (114) include a motor control model (116) that is trained to determine, responsive to receiving, and based at least in part on, the vehicle operation data (136), an operating characteristic (134) corresponding to the electric motor (104). Such operating characteristics (134) of the electric motor (104) can include, for example, the load percentage of the motor (i.e., the percentage of rated load that the motor is operating at), thermal characteristics of the motor, motor speed, motor efficiency, motor winding resistance, output power, and many other quantifiable aspects of the motor's operation.

In some implementations, the one or more processors (120) may include, or are coupled to, a vehicle operation data interface (122) ("VOD I/F") that is configured to receive vehicle operation data (136). For example, the vehicle operation data interface (122) may receive control inputs (130) from the one or more operator controls (128) and sensor data (124) from one or more vehicle operation sensors (118). In an illustrative implementation, the vehicle operation data interface (122) may be an electrical signal bus, an optical signal bus, and/or a wireless interface.

In some implementations, the one or more processors (120) are configured to generate control signals (138) via a control signal interface (140) to adjust operation of the electric motor (104). In an illustrative implementation, the control signal interface (140) may be an electrical signal bus, an optical signal bus, and/or a wireless interface.

In some implementations, during operation of the vehicle (102), a control loop for operation of the electric motor (104) includes receiving vehicle operation data (136) (e.g., control inputs (130) from one or more operator controls (128) and sensor data (124) indicating a state of the electric motor (104)), inputting at least a portion of the vehicle operation data (136) to the motor control model (116) to generate an operating characteristic (134), and sending the control signal (138) based on the operating characteristic (134) to adjust operation of the electric motor (104). Adjusting operation of the electric motor (104), thereby affecting the performance of the vehicle (102).

In some implementations, the motor control model (116) is trained to optimize or balance one or more characteristics of the electric motor (104), such as power output, torque production, efficiency, responsiveness, motor longevity, and battery longevity, as illustrative, non-limiting examples. In some implementations, the motor control model (116) is generated and installed by a manufacturer of the vehicle (102) based on experimental or test data generated using one or more test vehicles, the vehicle (102) itself, or a combination thereof. The motor control model (116) may indicate default values that enhance operation of the vehicle (102), by tuning performance of the electric motor (104) based on the state of the electric motor (104) and the control inputs (130) responsive to the operator (132) of the vehicle (102). The operator (132) can be within the vehicle (102), such as within a cabin or cockpit of the vehicle (102), or remote from the vehicle (102), such as in implementations in which the one or more operator controls (128) include a remote controller for the vehicle (102) (e.g., for remote control of the vehicle (102) via wireless signaling).

In some implementations, the motor control model (116) can be updated after a period of use of the vehicle (102). For example, the one or more processors (120) may be configured to store a history of vehicle operation data (136) and to update (e.g., periodically, continuously, or according to some other schedule) the motor control model (116), such as to adapt to changes in battery performance, changes in performance requirements of the operator (132) as inferred from the control inputs (130), or changes due to external factors (e.g., regulations or instructions received from an external authority), as illustrative, non-limiting examples. Alternatively, or in addition, such history information may be transmitted to a remote system (e.g., to a cloud-based server system via a wireless network) that determines such updates and pushes data indicative of the updated motor control model (116) to the vehicle (102). In some implementations, update of the motor control model (116) is further based on aggregated data from multiple vehicles, such as by using historical data of a group of vehicles sharing similar aspects as the vehicle (102). Thus, in various implementations, motor control may be dynamically adjusted due to characteristics (or changes in characteristics) of the vehicle (102), the operator (132), the weather or other environmental factors, vehicle regulations, etc.

Although in some implementations, the electric motor (104) may be an fully electric motor, in other implementations the electric motor (104) may part of a hybrid engine, such as a hybrid electric-petroleum engine that also includes a traditional combustion engine whose operation consumes traditional gasoline or fuel. In such implementations, sensor data (124) may further include data corresponding to components of the combustion engine. Further, in this example, the one or more trained models (114) may be configured to adjust operation of the electric motor further based on the state of the mechanical components, such as to engage in regenerative braking through the electric motor in response to mechanical components being placed in a state where the vehicle is being slowed down, to tune the electrical motor to operate in a mode that consumes less battery power when the battery is depleted and the vehicle contains sufficient fuel, as illustrative, non-limiting examples.

In some implementations, although the one or more trained models (114) are described as including the motor control model (116), in other implementations, the one or more trained models (114) also include other trained models that can provide inputs to, or operate in parallel with, the motor control model (116). Other trained models that may be included in the one or more trained models (114) include a travel type model, a fleet operation model, an operator type model, or any combination thereof, as described further with reference to FIGS. 2-4B.

Figure 2:
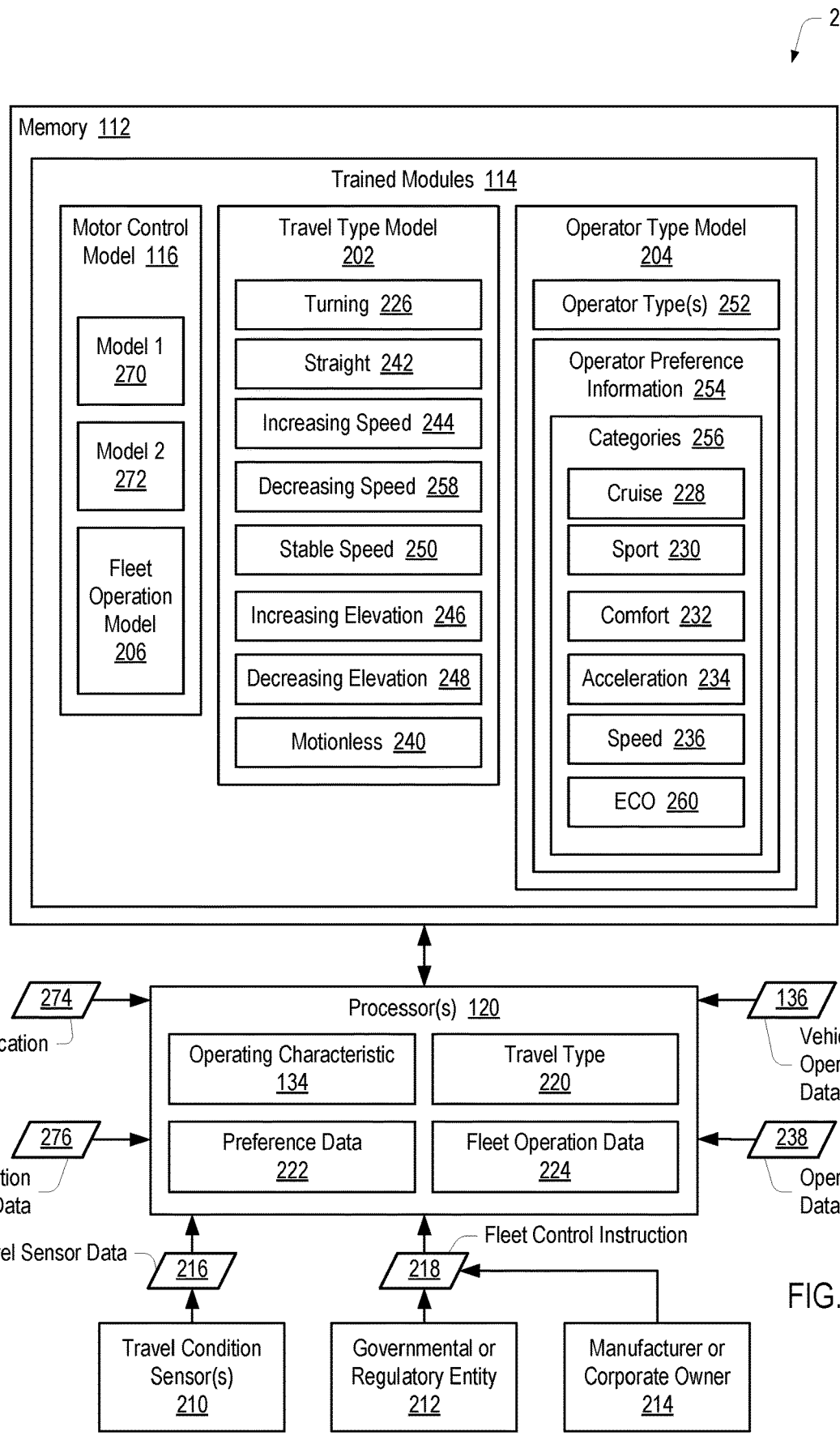
FIG. 2 is a block diagram of components that may be included in the vehicle of FIG. 1 in accordance with some examples of the present disclosure.

For further explanation, FIG. 2 depicts a diagram (200) of a particular implementation of components that may be included in the vehicle (102) in conjunction with controlling the electric motor (104) using one or more additional trained models (114). As illustrated, in addition to the motor control model (116), the one or more trained models (114) include a travel type model (202), an operator type model (204), and a fleet operation model (206).

In some implementations, the vehicle (102) includes one or more travel condition sensors (210) that are configured to generate travel sensor data (216) corresponding to a travel condition. In an illustrative example, the one or more travel condition sensors (210) can correspond to one or more magnetic compasses, accelerometers, location or positioning sensors, cameras, pressure sensors, temperature sensors, altimeters, or any other sensor that can generate data indicative of a travel condition. The one or more processors (120) are configured to determine, using the travel type model (202), a travel type (220) based on the travel sensor data (216), and to determine the operating characteristic (134) further based on the travel type (220). For example, in a particular implementation, the travel type model (202) is configured to process the travel sensor data (216) to select the travel type (220) from among a plurality of travel types based on the travel sensor data (216). In an illustrative implementation, the plurality of travel types includes at least one of: turning (226), straight travel (242), increasing speed (244), decreasing speed (258), stable speed (250), increasing elevation (246), decreasing elevation (248), or motionless (240). In other implementations, other travel types may be used in place of, or in addition to, any or all of the travel types illustrated in FIG. 2. For example, in implementations in which the vehicle (102) is an aircraft, the travel type model (202) may be configured to select from among different travel types as compared to implementations in which the vehicle (102) is a land vehicle or a watercraft.

In some implementations, the one or more processors (120) are further configured to determine, using the operator type model (204), preference data (222) corresponding to an operator (132) of the vehicle (102), and to determine an operating characteristic (134) further based on the preference data (222). For example, the one or more processors (120) may receive operator data (238) indicating an identity of an operator of the vehicle (102), measured characteristics of the operator (132), such as data corresponding to the control inputs (130), biometric data such as voice, facial recognition, weight, etc., or other data that is indicative of the operator (132). In this example, the measured characteristics of the operator may enable selection of a particular operator profile or determination of a particular one of one or more operator types (252). Examples of the operator types (252) may include aggressive, defensive, conservative, abrupt, smooth, and high-performance, one or more other operator types, or any combination thereof.

In a particular implementation, the operator type model (204) includes, for each of the one or more operator types (252), operator preference information (254) regarding a plurality of travel types. As an illustrative example, the operator preference information (254) indicates a preference for one or more categories (256) corresponding to at least one of cruise (228), sport (230), comfort (232), acceleration (234), speed (236), or economy ("ECO") (260). Each of the one or more categories (256) can correspond a type of vehicle performance that is preferred, or predicted to be preferred, by a particular operator (132) or operator type based on each particular type of travel of the vehicle (102). As an example, the operator type model (204) may determine that an "aggressive" operator type prefers that the vehicle (102) operate according to the acceleration (234) category (e.g., adjusting throttle response, transmission shift points, etc. for improved power and performance), when the determined travel type (220) corresponds to straight travel (242) and that a "conservative" operator type prefers that the vehicle (102) operates according to the ECO (260) category (e.g., adjusting throttle response, transmission shift points, etc. for improved fuel efficiency) when the travel type (220) corresponds to straight travel (242). As another example, the operator type model (204) may determine that an "aggressive" operator type prefers that the vehicle (102) operates according to the sport (230) category when the determined travel type (220) corresponds to turning (226) and that a "conservative" operator type prefers that the vehicle (102) operate according to the comfort (232) category when the travel type (220) corresponds to turning (226).

In a particular implementation, the one or more processors (120) are further configured to determine, using the fleet operation model (206), fleet operation data (224) corresponding to fleet control data (218) that is received at the vehicle (102) and to determine the operating characteristic (134) further based on the fleet operation data (224). In some examples, the fleet control data (218) corresponds to an instruction from a governmental or regulatory entity (212). To illustrate, a municipality may issue fleet control data (218) instructing vehicles to operate in a lowered-emission mode in response to air pollution levels exceeding a threshold amount. In other example, the fleet control data (218) corresponds to an instruction from a manufacturer or corporate owner (214) of the vehicle (102). To illustrate, an owner of a fleet of vehicles including the vehicle (102) (e.g., the vehicle (102) may be a commercial aircraft owned by an airline or a delivery truck owned by a business) may issue the fleet control data (218) instructing vehicles in the fleet to operate in an increased fuel-efficiency mode in response to an increase in fuel prices.

In some implementations, a travel type (220), a preference data (222), and fleet operation data (224) may be used in conjunction with the vehicle operation data (136) to determine the operating characteristic (134), where the operating characteristic (134) may be used to generate a control signal (138). The operating characteristic (134) may generally correspond to a default value based on the vehicle operation data (136), as modified or adjusted based on the operator's preference, based on the type of travel indicated by the travel type (220), and responsive to the fleet control data (218). Thus, various independent (and potentially competing) criteria may be factored into the final determination of how the electric motor is to be controlled. More generally, independent criteria may include any type of complementary data, such as geography, terrain, climate, traffic-related information, road conditions, GPS measurements such as altitude or global coordinates, information that may be obtained through sensors, through communication links providing external condition information or driving preferences from personal computing devices for an operator, or some other type of information relevant to or describing how a vehicle may be operating—including combinations of these various independent criteria.

Further, in some examples, a motor control model (116) includes multiple selectable models, illustrated as a first model (270) and a second model (272). The motor control model (116) may be configured to select a particular model from among the multiple selectable models (270, 272) to generate an operating characteristic (134). As a first example, the first model (270) may be trained for operating the electric motor (104) and may be updated periodically, as described above. The first model (270) may be configured to enhance, maximize, or improve one or more aspects of performance, such as horsepower, torque, battery efficiency, etc., in conformance with a regulatory requirement, such as fuel efficiency or emissions restrictions that may be particularly relevant when the vehicle (102) is a hybrid vehicle that includes both an electric motor and a combustion engine. However, if the regulatory requirement is updated (e.g., emissions are further restricted), operation of the vehicle (102) in accordance with the first model 270 may result in the vehicle (102) being in violation of the updated regulatory requirement. In response to announcement or promulgation of the updated regulatory requirement, the second model (272) may be generated and provided to the memory (112) (e.g., via wireless data transmission) to enable operation of the vehicle (102) in conformance with the updated regulatory requirement. The vehicle (102) may continue to use the first model 270 until a notification (274) is received, such as from a manufacturer of the vehicle (102), to deselect the first model 270 and to select the second model (272). As a result, when a new regulation on fuel efficiency or emissions is promulgated, the vehicle (102) can remain in compliance with the new regulation with negligible cost as compared to conventional alternatives, such as upgrading or replacing the vehicle (102).

As a second example, the first model (270) may be trained for operating the electric motor (104) in compliance with regulations of a first jurisdiction, and the second model (272) may be trained for operating the electric motor (104) in compliance with regulations of a second jurisdiction. Location data (276) (e.g., Global Positioning System (GPS) data, one or more other types of location data, or any combination thereof) may be received at the one or more processors (120) and compared to jurisdiction boundary data to determine which jurisdiction the vehicle (102) is located in and to select the appropriate one of the first model (270) and the second model (272). Although two models (270, 272) are illustrated, in other implementations any number of models may be trained, downloaded, stored, and selected during operation of the vehicle (102).

As a third example, one or more additional models may be included for various uses of the vehicle (102) within a particular jurisdiction. For example, a particular jurisdiction may enact strict emissions regulations but may provide an exception for vehicles operating on a racetrack. Thus, the vehicle (102) may operate using the first model (270) to comply with that jurisdiction's strict emissions requirements, and when the location data (276) indicates that the vehicle (102) has entered (or is within) a geographic boundary of a racetrack (e.g., within a geofence around the racetrack), the second model (272) may be selected to enable the vehicle (102) to operate in a higher-performance mode. Other location-based models may be used based on particular jurisdictional requirements, such as for regulations that distinguish between urban and rural operation, as an illustrative, non-limiting examples.

In some implementations, while descriptive labels are used to provide examples of various categories and classes associated with the trained models (114) for purpose of explanation, it should be understood that the various categories and classes used by one or more of the trained models (114) may be determined based on processing empirical data, such as using an unsupervised machine learning clustering analysis, as a non-limiting example. For example, the travel types used by the travel type model (202), the operator types (252) used by the operator type model (204), the categories (256) used by the operator type model (204), or any combination thereof, may be generated based on supervised or unsupervised analysis of data from one or more sources, such as an aggregated history of sensor data and operator control data from a fleet of vehicles. Such categories and classes are subject to change as additional data collection and analysis results in updated models that are provided to the vehicle (102). In some examples, motor control models may be generated based on reinforcement learning with respect to a motor performance simulator environment.

Further, while FIG. 2 depicts an implementation that uses four trained models (114), in other implementations, one or more of the trained models (114) may be omitted, one or more additional models may be included, or any combination thereof. Examples of various implementations that include different combinations of the motor control model (116), the travel type model (202), the operator type model (204), and the fleet operation model (206) are described with reference to FIGS. 3A-3C and FIGS. 4A and 4B.

Figure 3A:
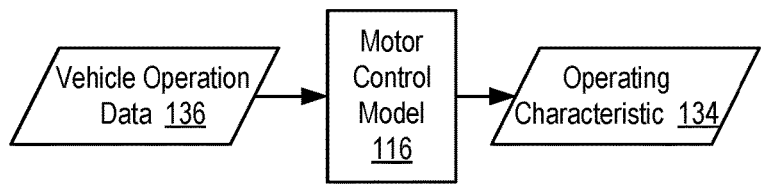
FIG. 3A is a data flow diagram of an example of using a trained model to determine an operating characteristic associated with an electric motor in accordance with some examples of the present disclosure.
Figure 3B:
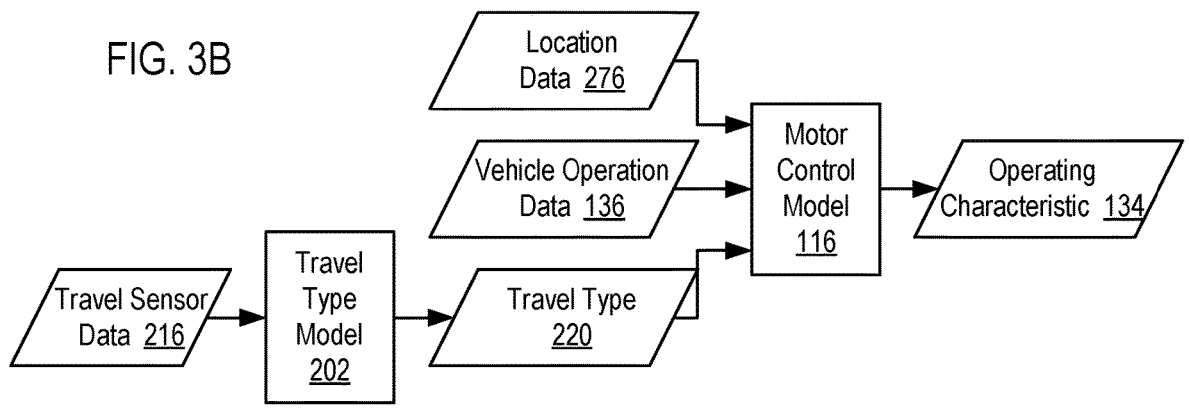
FIG. 3B is a data flow diagram of an example of using multiple trained models to determine an operating characteristic associated with an electric motor in accordance with some examples of the present disclosure.
Figure 3C:
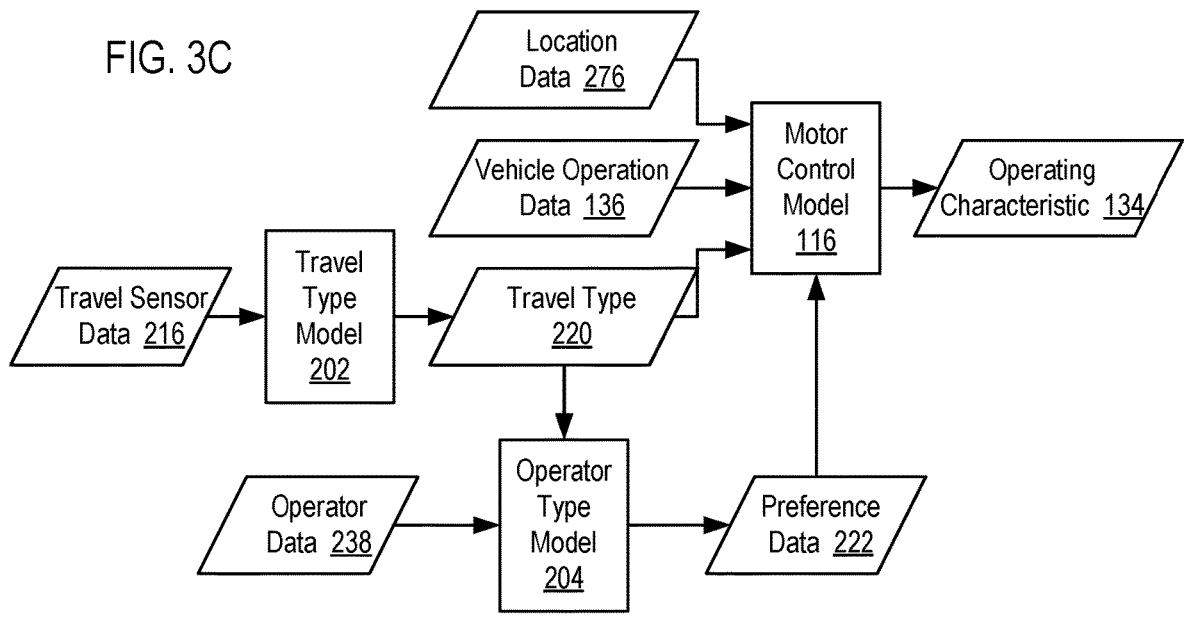
FIG. 3C is a data flow diagram of an example of using multiple trained models to determine an operating characteristic associated with an electric motor in accordance with some examples of the present disclosure.

For further explanation, FIGS. 3A-3C depict diagrams of various examples of operation in which the one or more trained models (114) are used to determine an operating characteristic (134). FIG. 3A corresponds to an implementation in which the vehicle operation data (136) is received and processed by the motor control model (116) to generate the operating characteristic (134), such as described with reference to FIG. 1. For example, the motor control model (116) can include a classifier that maps the vehicle operation data (136) to a discrete value or set of values that are output as the operating characteristic (134). As another example, the motor control model (116) can include a regression model that maps the vehicle operation data (136) to particular values of a set of continuous values corresponding to the operating characteristic (134).

For further explanation, FIG. 3B depicts an implementation that includes the motor control model (116) and the travel type model (202). The travel type model (202) receives and processes the travel sensor data (216) and outputs the travel type (220). The motor control model (116) receives the vehicle operation data (136), the location data (276), and the travel type (220) as inputs. The motor control model (116) is configured to process the vehicle operation data (136) in conjunction with the travel type (220) and the location data (276) to determine the operating characteristic (134).

For further explanation, FIG. 3C depicts an implementation that includes the motor control model (116), the travel type model (202), and the operator type model (204). The travel type model (202) receives and processes the travel sensor data (216) and outputs the travel type (220). The operator type model (204) receives and processes the travel type (220) and the operator data (238) to determine the preference data (222). The motor control model (116) receives the vehicle operation data (136), the location data (276), the travel type (220), and the preference data (222) as inputs. The motor control model (116) is configured to process the vehicle operation data (136) in conjunction with the location data (276), the travel type (220) and the preference data (222) to determine the operating characteristic (134).

Figure 4A:
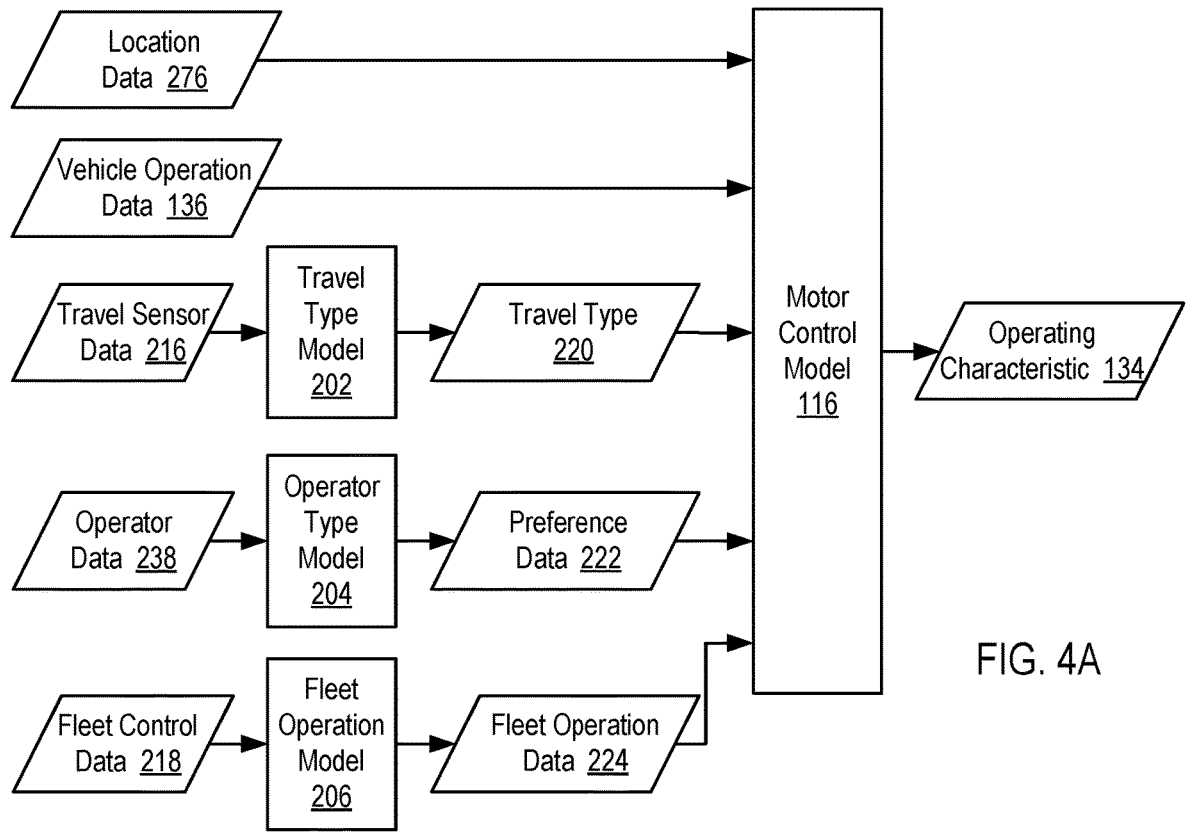
FIG. 4A is a data flow diagram of an example of using multiple trained models to determine an operating characteristic associated with an electric motor in accordance with some examples of the present disclosure.

For further explanation, FIG. 4A depicts an implementation that includes a motor control model (116), a travel type model (202), a operator type model (204), and a fleet operation model (206). The travel type model (202) receives and processes the travel sensor data (216) and outputs the travel type (220). The operator type model (204) receives and processes the operator data (238) and outputs the preference data (222), although in other implementations the operator type model (204) is also responsive to the travel type (220). The fleet operation model (206) receives and processes the fleet control data (218) and outputs the fleet operation data (224). The motor control model (116) receives the vehicle operation data (136), the location data (276), the travel type (220), the preference data (222), and the fleet operation data (224) as inputs. The motor control model (116) is configured to process the vehicle operation data (136) in conjunction with the location data (276), the travel type (220), the preference data (222), and the fleet operation data (224) to determine the operating characteristic (134).

Figure 4B:
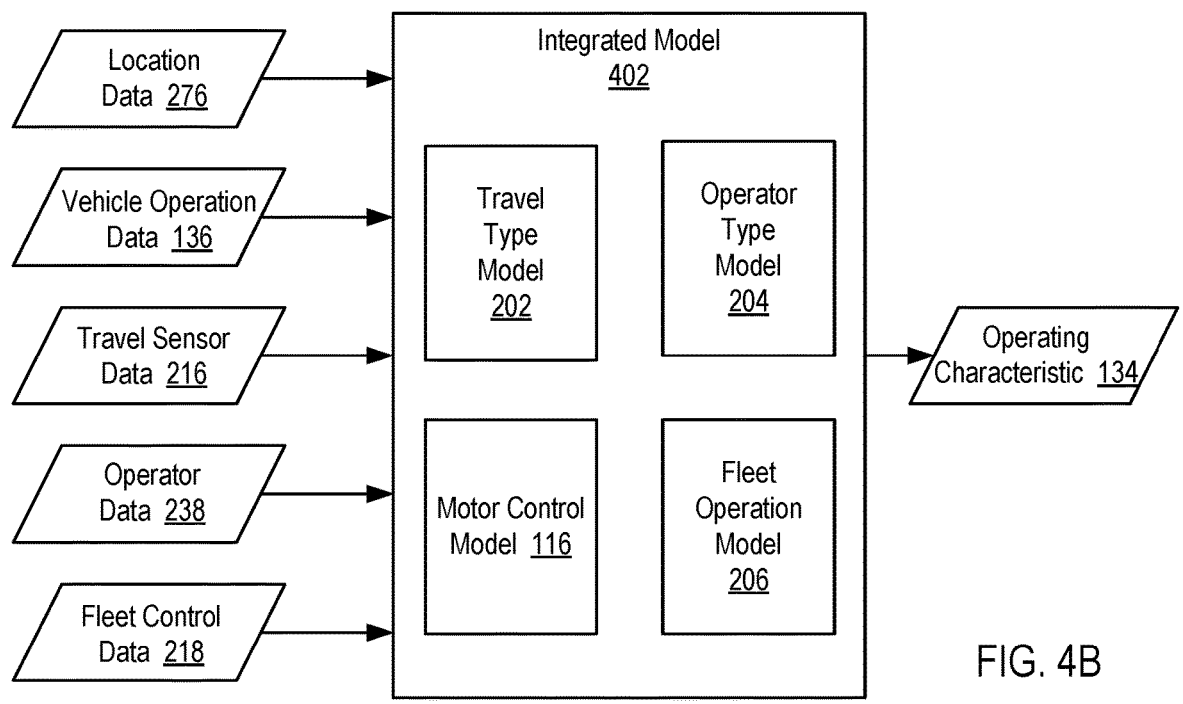
FIG. 4B is a data flow diagram of a particular example of using an integrated model to determine an operating characteristic associated with an electric motor in accordance with some examples of the present disclosure.

In contrast to FIGS. 3A-3C and FIG. 4A, in which the motor control model (116) generates the operating characteristic (134) based on received inputs that include one or more of vehicle operation data (136), location data (276), travel type (220), preference data (222), and fleet operation data (224), FIG. 4B depicts an implementation in which an integrated model (402) is configured to generate an operating characteristic (134) based on inputs including travel sensor data (216), operator data (238), fleet control data (218), and vehicle operation data (136). The integrated model (402) includes functionality associated with the motor control model (116), the travel type model (202), the operator type model (204), and the fleet operation model (206), although the motor control model (116), the travel type model (202), the operator type model (204), and the fleet operation model (206) are not implemented as discrete, separate components as in FIG. 4A.

Implementing the motor control model (116), the travel type model (202), the operator type model (204), and the fleet operation model (206) as discrete components as in FIG. 4A enables smaller, less complex individual modules that may be independently updated, thereby using reduced processing resources, as compared to updating a single integrated model. However, using the single integrated model (402) of FIG. 4B enables the operating characteristic (134) to be determined based on the combined inputs with enhanced accuracy as compared to using the multiple independent models of FIG. 4A.

Figure 5:
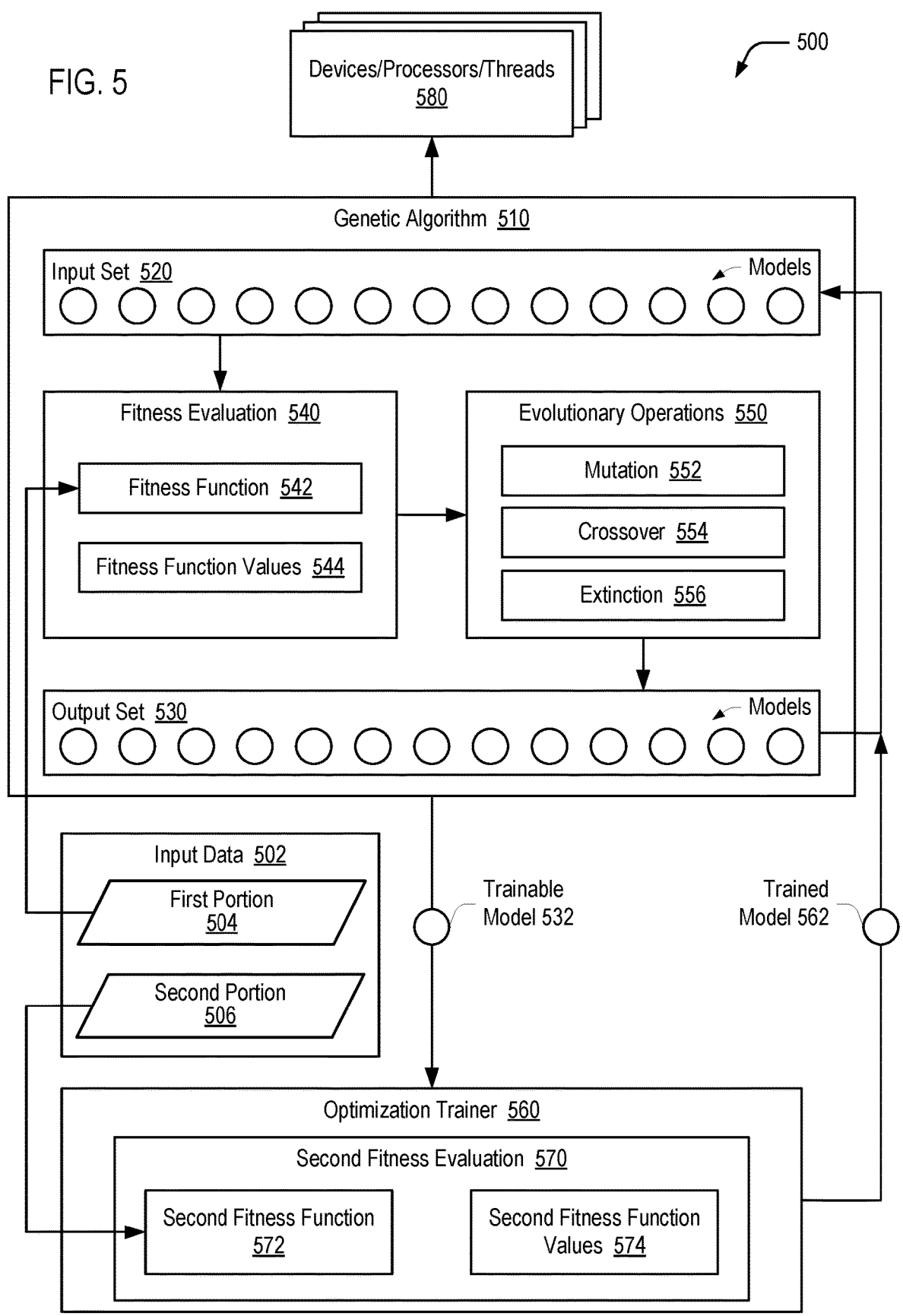
FIG. 5 is a diagram of an example of a system to generate one or more trained models that are used in conjunction with controlling an electric motor in accordance with some examples of the present disclosure.

For further explanation, FIG. 5 depicts an example of a system (500) for generating a machine learning data model, such as one or more of the trained models (114), that can be used by the one or more processors (120), the ECM (150), or the vehicle (102). Although FIG. 5 depicts a particular example for purpose of explanation, in other implementations other systems may be used for generating or updating one or more of the trained models (114).

In some examples, the system (500), or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system (500) includes a genetic algorithm (510) and an optimization trainer (560). The optimization trainer (560) is, for example, a backpropagation trainer, a derivative free optimizer (DFO), an extreme learning machine (ELM), etc. In particular implementations, the genetic algorithm (510) is executed on a different device, processor (e.g., central processor unit (CPU), graphics processing unit (GPU) or other type of processor), processor core, and/or thread (e.g., hardware or software thread) than the optimization trainer (560). The genetic algorithm (510) and the optimization trainer (560) are executed cooperatively to automatically generate a machine learning data model (e.g., one of the trained models (114) of FIGS. 1-2, such as depicted in FIGS. 3A-4B and referred to herein as "models" for ease of reference), such as a neural network or an autoencoder, based on the input data (502). In this example, the system (500) performs an automated model building process that enables users, including inexperienced users, to quickly and easily build highly accurate models based on a specified data set.

In some implementations, during configuration of the system (500), a user specifies the input data (502). In some implementations, the user may also specify one or more characteristics of models that can be generated. In such implementations, the system (500) constrains models processed by the genetic algorithm (510) to those that have the one or more specified characteristics. For example, the specified characteristics may constrain allowed model topologies (e.g., to include no more than a specified number of input nodes or output nodes, no more than a specified number of hidden layers, no recurrent loops, etc.). In some examples, constraining the characteristics of the models can reduce the computing resources (e.g., time, memory, processor cycles, etc.) needed to converge to a final model, can reduce the computing resources needed to use the model (e.g., by simplifying the model), or both.

In some implementations, a user can configure aspects of the genetic algorithm (510) via input to graphical user interfaces (GUIs). For example, the user may provide input to limit a number of epochs that will be executed by the genetic algorithm (510). Alternatively, the user may specify a time limit indicating an amount of time that the genetic algorithm (510) has to execute before outputting a final output model, and the genetic algorithm (510) may determine a number of epochs that will be executed based on the specified time limit. To illustrate, an initial epoch of the genetic algorithm (510) may be timed (e.g., using a hardware or software timer at the computing device executing the genetic algorithm (510)), and a total number of epochs that are to be executed within the specified time limit may be determined accordingly. As another example, the user may constrain a number of models evaluated in each epoch, for example by constraining the size of an input set (520) of models and/or an output set (530) of models.

In some implementations, a genetic algorithm (510) represents a recursive search process. Consequently, each iteration of the search process (also called an epoch or generation of the genetic algorithm (510)) has an input set (520) of models (also referred to herein as an input population) and an output set (530) of models (also referred to herein as an output population). The input set (520) and the output set (530) may each include a plurality of models, where each model includes data representative of a machine learning data model. For example, each model may specify a neural network or an autoencoder by at least an architecture, a series of activation functions, and connection weights. The architecture, also referred to herein as a topology, of a model includes a configuration of layers or nodes and connections therebetween. The models may also be specified to include other parameters, including but not limited to bias values/functions and aggregation functions.

For example, each model can be represented by a set of parameters and a set of hyperparameters. In this context, the hyperparameters of a model define the architecture of the model (e.g., the specific arrangement of layers or nodes and connections), and the parameters of the model refer to values that are learned or updated during optimization training of the model. For example, the parameters include or correspond to connection weights and biases.

In a particular implementation, a model is represented as a set of nodes and connections therebetween. In such implementations, the hyperparameters of the model include the data descriptive of each of the nodes, such as an activation function of each node, an aggregation function of each node, and data describing node pairs linked by corresponding connections. The activation function of a node is a step function, sine function, continuous or piecewise linear function, sigmoid function, hyperbolic tangent function, or another type of mathematical function that represents a threshold at which the node is activated. The aggregation function is a mathematical function that combines (e.g., sum, product, etc.) input signals to the node. An output of the aggregation function may be used as input to the activation function.

In other implementations, the model is represented on a layer-by-layer basis. For example, the hyperparameters define layers, and each layer includes layer data, such as a layer type and a node count. Examples of layer types include fully connected, long short-term memory (LSTM) layers, gated recurrent units (GRU) layers, and convolutional neural network (CNN) layers. In some implementations, all of the nodes of a particular layer use the same activation function and aggregation function. In such implementations, specifying the layer type and node count fully may describe the hyperparameters of each layer. In other implementations, the activation function and aggregation function of the nodes of a particular layer can be specified independently of the layer type of the layer. For example, in such implementations, one fully connected layer can use a sigmoid activation function and another fully connected layer (having the same layer type as the first fully connected layer) can use a tan h activation function. In such implementations, the hyperparameters of a layer include layer type, node count, activation function, and aggregation function. Further, a complete autoencoder is specified by specifying an order of layers and the hyperparameters of each layer of the autoencoder.

In some implementations, a genetic algorithm (510) may be configured to perform speciation. For example, the genetic algorithm (510) may be configured to cluster the models of the input set (520) into species based on "genetic distance" between the models. The genetic distance between two models may be measured or evaluated based on differences in nodes, activation functions, aggregation functions, connections, connection weights, layers, layer types, latent-space layers, encoders, decoders, etc. of the two models. In an illustrative example, the genetic algorithm (510) may be configured to serialize a model into a bit string. In this example, the genetic distance between models may be represented by the number of differing bits in the bit strings corresponding to the models. The bit strings corresponding to models may be referred to as "encodings" of the models.

In some implementations, after configuration, a genetic algorithm (510) may begin execution based on the input data (502). Parameters of the genetic algorithm (510) may include but are not limited to, mutation parameter(s), a maximum number of epochs the genetic algorithm (510)

will be executed, a termination condition (e.g., a threshold fitness value that results in termination of the genetic algorithm (510) even if the maximum number of generations has not been reached), whether parallelization of model testing or fitness evaluation is enabled, whether to evolve a feed-forward or recurrent neural network, etc. As used herein, a "mutation parameter" affects the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm (510) uses a single mutation parameter or set of mutation parameters for all of the models. In such examples, the mutation parameter may impact how often, how much, and/or what types of mutations can happen to any model of the genetic algorithm (510). In alternative examples, the genetic algorithm (510) maintains multiple mutation parameters or sets of mutation parameters, such as for individual or groups of models or species. In particular aspects, the mutation parameter(s) affect crossover and/or mutation operations, which are further described below.

In some implementations, for an initial epoch of a genetic algorithm (510), the topologies of the models in the input set (520) may be randomly or pseudo-randomly generated within constraints specified by the configuration settings or by one or more architectural parameters. Accordingly, the input set (520) may include models with multiple distinct topologies. For example, a first model of the initial epoch may have a first topology, including a first number of input nodes associated with a first set of data parameters, a first number of hidden layers including a first number and arrangement of hidden nodes, one or more output nodes, and a first set of interconnections between the nodes. In this example, a second model of the initial epoch may have a second topology, including a second number of input nodes associated with a second set of data parameters, a second number of hidden layers including a second number and arrangement of hidden nodes, one or more output nodes, and a second set of interconnections between the nodes. The first model and the second model may or may not have the same number of input nodes and/or output nodes. Further, one or more layers of the first model can be of a different layer type that one or more layers of the second model. For example, the first model can be a feedforward model, with no recurrent layers; whereas, the second model can include one or more recurrent layers.

In some implementations, a genetic algorithm (510) may automatically assign an activation function, an aggregation function, a bias, connection weights, etc. to each model of the input set (520) for the initial epoch. In some aspects, the connection weights are initially assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes or layers of a model may have different types of activation functions. Aggregation functions may similarly be randomly or pseudo-randomly assigned for the models in the input set (520) of the initial epoch. Thus, the models of the input set (520) of the initial epoch may have different topologies (which may include different input nodes corresponding to different input data fields if the data set includes many data fields) and different connection weights. Further, the models of the input set (520) of the initial epoch may include nodes having different activation functions, aggregation functions, and/or bias values/functions.

In some implementations, during execution, a genetic algorithm (510) performs fitness evaluation (540) and evolutionary operations (550) on the input set (520). In this context, fitness evaluation (540) includes evaluating each model of the input set (520) using a fitness function (542) to determine a fitness function value (544) ("FF values" in FIG. 5) for each model of the input set (520). The fitness function values (544) are used to select one or more models of the input set (520) to modify using one or more of the evolutionary operations (550). In FIG. 5, the evolutionary operations (550) include mutation operations (552), crossover operations (554), and extinction operations (556), each of which is described further below.

In some implementations, during a fitness evaluation (540), each model of the input set (520) is tested based on the input data (502) to determine a corresponding fitness function value (544). For example, a first portion (504) of the input data (502) may be provided as input data to each model, which processes the input data (according to the network topology, connection weights, activation function, etc., of the respective model) to generate output data. The output data of each model is evaluated using the fitness function (542) and the first portion (504) of the input data (502) to determine how well the model modeled the input data (502). In some examples, fitness of a model is based on reliability of the model, performance of the model, complexity (or sparsity) of the model, size of the latent space, or a combination thereof.

In some implementations, fitness evaluation (540) of the models of the input set (520) is performed in parallel. To illustrate, the system (500) may include devices, processors, cores, and/or threads (580) in addition to those that execute the genetic algorithm (510) and the optimization trainer (560). These additional devices, processors, cores, and/or threads (580) can perform the fitness evaluation (540) of the models of the input set (520) in parallel based on a first portion (504) of the input data (502) and may provide the resulting fitness function values (544) to the genetic algorithm (510).

In some implementations, a mutation operation (552) and a crossover operation (554) are highly stochastic under certain constraints and a defined set of probabilities optimized for model building, which produces reproduction operations that can be used to generate the output set (530), or at least a portion thereof, from the input set (520). In a particular implementation, the genetic algorithm (510) utilizes intra-species reproduction (as opposed to inter-species reproduction) in generating the output set (530). In other implementations, inter-species reproduction may be used in addition to or instead of intra-species reproduction to generate the output set (530). Generally, the mutation operation (552) and the crossover operation (554) are selectively performed on models that are more fit (e.g., have higher fitness function values (544), fitness function values (544) that have changed significantly between two or more epochs, or both).

In some implementations, an extinction operation (556) uses a stagnation criterion to determine when a species should be omitted from a population used as the input set (520) for a subsequent epoch of the genetic algorithm (510). Generally, the extinction operation (556) is selectively performed on models that are satisfy a stagnation criteria, such as modes that have low fitness function values (544), fitness function values (544) that have changed little over several epochs, or both.

In accordance with the present disclosure, cooperative execution of a genetic algorithm (510) and an optimization trainer (560) is used arrive at a solution faster than would occur by using a genetic algorithm (510) alone or an optimization trainer (560) alone. Additionally, in some implementations, the genetic algorithm (510) and the optimization trainer (560) evaluate fitness using different data sets, with different measures of fitness, or both, which can improve fidelity of operation of the final model. To facilitate cooperative execution, a model (referred to herein as a trainable model (532) in FIG. 5) is occasionally sent from the genetic algorithm (510) to the optimization trainer (560) for training. In a particular implementation, the trainable model (532) is based on crossing over and/or mutating the fittest models (based on the fitness evaluation (540)) of the input set (520). In such implementations, the trainable model (532) is not merely a selected model of the input set (520); rather, the trainable model (532) represents a potential advancement with respect to the fittest models of the input set (520).

In some implementations, an optimization trainer (560) uses a second portion (506) of the input data (502) to train the connection weights and biases of the trainable model (532), thereby generating a trained model (562). The optimization trainer (560) does not modify the architecture of the trainable model (532).

In some implementations, during optimization, an optimization trainer (560) provides a second portion (506) of the input data (502) to the trainable model (532) to generate output data. The optimization trainer (560) performs a second fitness evaluation (570) by comparing the data input to the trainable model (532) to the output data from the trainable model (532) to determine a second fitness function value (574) based on a second fitness function (572). The second fitness function (572) is the same as the first fitness function (542) in some implementations and is different from the first fitness function (542) in other implementations. In some implementations, the optimization trainer (560) or portions thereof is executed on a different device, processor, core, and/or thread than the genetic algorithm (510). In such implementations, the genetic algorithm (510) can continue executing additional epoch(s) while the connection weights of the trainable model (532) are being trained by the optimization trainer (560). When training is complete, the trained model (562) is input back into (a subsequent epoch of) the genetic algorithm (510), so that the positively reinforced "genetic traits" of the trained model (562) are available to be inherited by other models in the genetic algorithm (510).

In implementations where the genetic algorithm (510) employs speciation, a species ID of each of the models may be set to a value corresponding to the species that the model has been clustered into. A species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm (510) may maintain a data structure that tracks the fitness of each species across multiple epochs. Based on the species fitness, the genetic algorithm (510) may identify the "fittest" species, which may also be referred to as "elite species." Different numbers of elite species may be identified in different embodiments.

In some implementations, a genetic algorithm (510) uses species fitness to determine if a species has become stagnant and is therefore to become extinct. As an illustrative non-limiting example, the stagnation criterion of the extinction operation (556) may indicate that a species has become stagnant if the fitness of that species remains within a particular range (e.g., +/−5%) for a particular number (e.g., 5) of epochs. If a species satisfies a stagnation criterion, the species and all underlying models may be removed from subsequent epochs of the genetic algorithm (510).

In some implementations, the fittest models of each "elite species" may be identified. The fittest models overall may also be identified. An "overall elite" need not be an "elite member," e.g., may come from a non-elite species. Different numbers of "elite members" per species and "overall elites" may be identified in different embodiments."

In some implementations, an output set (530) of the epoch is generated based on the input set (520) and the evolutionary operation (550). In the illustrated example, the output set (530) includes the same number of models as the input set (520). In some implementations, the output set (530) includes each of the "overall elite" models and each of the "elite member" models. Propagating the "overall elite" and "elite member" models to the next epoch may preserve the "genetic traits" resulted in caused such models being assigned high fitness values.

In some implementations, the rest of the output set (530) may be filled out by random reproduction using the crossover operation (554) and/or the mutation operation (552). After the output set (530) is generated, the output set (530) may be provided as the input set (520) for the next epoch of the genetic algorithm (510).

In some implementations, after one or more epochs of a genetic algorithm (510) and one or more rounds of optimization by an optimization trainer (560), the system (500) selects a particular model or a set of models as the final model (e.g., a model that is executable to perform one or more of the model-based operations of FIGS. 1-4B). For example, the final model may be selected based on the fitness function values (544, 574). For example, a model or set of models having the highest fitness function value (544 or 574) may be selected as the final model. When multiple models are selected (e.g., an entire species is selected), an ensemble can be generated (e.g., based on heuristic rules or using the genetic algorithm (510)) to aggregate the multiple models. In some implementations, the final model can be provided to the optimization trainer (560) for one or more rounds of optimization after the final model is selected. Subsequently, the final model can be output for use with respect to other data (e.g., real-time data).

Figure 6:
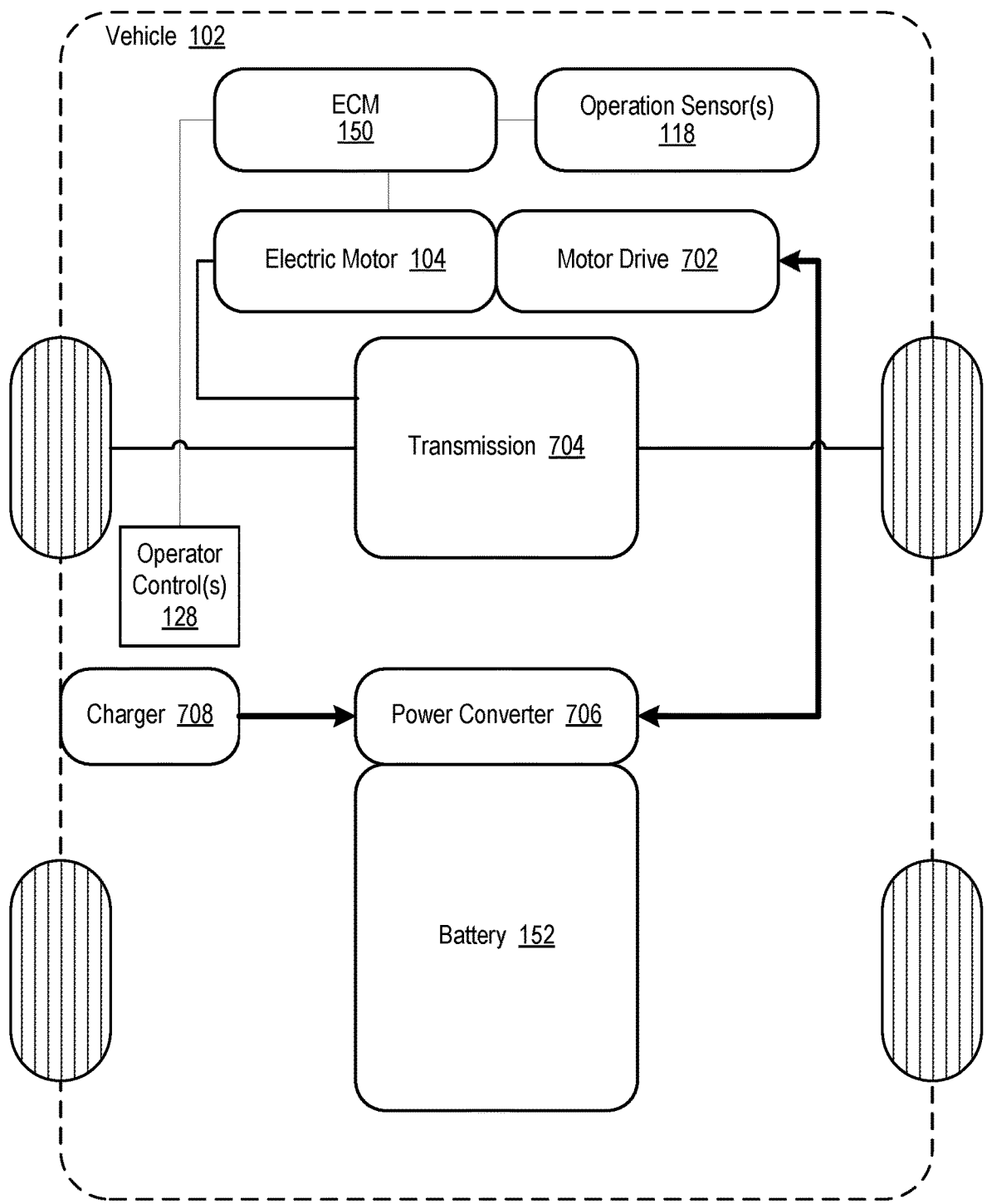
FIG. 6 sets forth a diagram of a vehicle in accordance with some embodiments of the present disclosure.

For further explanation, FIG. 6 sets forth a diagram of a vehicle (102) in accordance with some embodiments of the present disclosure. The example vehicle (102) depicted in FIG. 6 includes components that enable the vehicle to operate, in full or in part, as an electric vehicle rather than a traditional vehicle that is powered by an engine that consumes gasoline or other forms of petroleum-based fuel. In some embodiments, the vehicle (102) may be a hybrid vehicle that also includes traditional mechanical components such as an engine, fuel tank, and so on, in addition to the components depicted in FIG. 6. In other embodiments, the vehicle (102) may be embodied as a fully electric vehicle.

The vehicle depicted in FIG. 6 can include an ECM (150), operation sensor(s) (118), an electric motor (104), operator control(s) (128), and a battery (152), as depicted in embodiments described above. Although the battery (152) depicted in FIG. 6 and above has been depicted as a single element, readers will appreciate that the battery (152) can include, for example, multiple banks that are each comprised of multiple individual cells. Furthermore, although a single battery (152) is depicted for ease of illustration, vehicles described herein may include multiple batteries (150) that may be included for redundancy or to serve as power sources for different portions of the vehicle (102). For example, a first battery may be used to power the electric motor whereas a second battery may be included to power a display screen, audio system, and so on. Additional batteries may be included in other embodiments.

The vehicle (102) depicted in FIG. 6 also includes a motor drive (702) that is coupled to the electric motor (104), although in some embodiments the motor drive (702) and the electric motor (104) may be packaged as a single component. The motor drive (702) depicted in FIG. 6 may be configured to operate as a DC-to-AC (a.k.a., an inverter, a variable frequency drive) or at times a DC-to-DC power electronic converter, used to convert power from the high voltage DC bus to AC (or at times DC) power for the operation of motor. The motor drive (702) can be bidirectional for operating in both driving and regenerative braking mode.

The vehicle (102) depicted in FIG. 6 also includes a transmission (704) that is coupled to one or more of the vehicle's (102) wheels, for example, via an axle and other intermediate components. The transmission (704) depicted in FIG. 6 may be embodied, for example, as a device that transfers mechanical power from the electric motor (104) to drive the wheels. The transmission (704) depicted in FIG. 6 may be embodied as a single gear transmission with differential that is used to transfer mechanical power from the electric motor (102) (a.k.a., a traction motor) to drive the wheels of the vehicle. In other embodiments, to facilitate the presence of multiple gears, different gear ratios may be used on front and rear drive units. For example, at lower speeds, more than half of the power may go to a first drive unit (e.g., the rear drive unit), which may be optimized for lower speeds. As the speed of the vehicle (102) increases, however, a larger percentage of the power may be directed to a second drive unit (e.g., the front drive unit), which may have a better gear ratio for higher speeds. In yet other embodiments, the transmission may include multiple gears.

The vehicle (102) depicted in FIG. 6 also includes a power converter (706) that is coupled to the battery (152) and also to the charger (708), although in some embodiments some combination of these components may be packaged as a single component. The charger (708) may include or otherwise be coupled to a charging port that enables the vehicle (102) to be coupled to an external power supply, such that the charger (708) can operate as an AC-to-DC converter that takes the incoming AC electricity supplied via the charge port and converts it to DC power for charging the battery (152) via the power converter (706). The power converter (706) may be embodied as an electrical or electro-mechanical device for converting electrical energy, such that different switching states alter the input voltage and current through the use of capacitive and inductive elements, thereby resulting in an output voltage and current that is different than what was input to the power converter (706).

Readers will appreciate that although some combination of components depicted in FIG. 6 are described above as being packageable as a single component, in other embodiments other combinations of components may be packaged as a single component, so long as the single component includes component parts that carry out the functions and features described herein. Readers will further appreciate that electric vehicles (102) in accordance with other embodiments of the present disclosure can include fewer, additional, or different components than the example depicted in FIG. 6.

In some embodiments, battery cells or other portions of a particular battery (152) can occasionally fall into a state of "bad" health. In some cases, such cells should not reach a certain temperature, because there is risk of explosion or other adverse event. Moreover, in some cases even trying to charge a faulty cell can result in a dangerous thermal runaway situation. In order to prevent such situations, embodiments of the present disclosure can include a vehicle (102) that includes one or more thermal sensors (or other form of sensor) that is disposed in or near the battery (152), such that AI techniques can be used to correlate temperature data to profiles, and when certain profiles are detected automatic safety actions can be performed, such as disconnecting a particular battery or cell thereof. Some of these concepts will be described in greater detail below.

Figure 7:
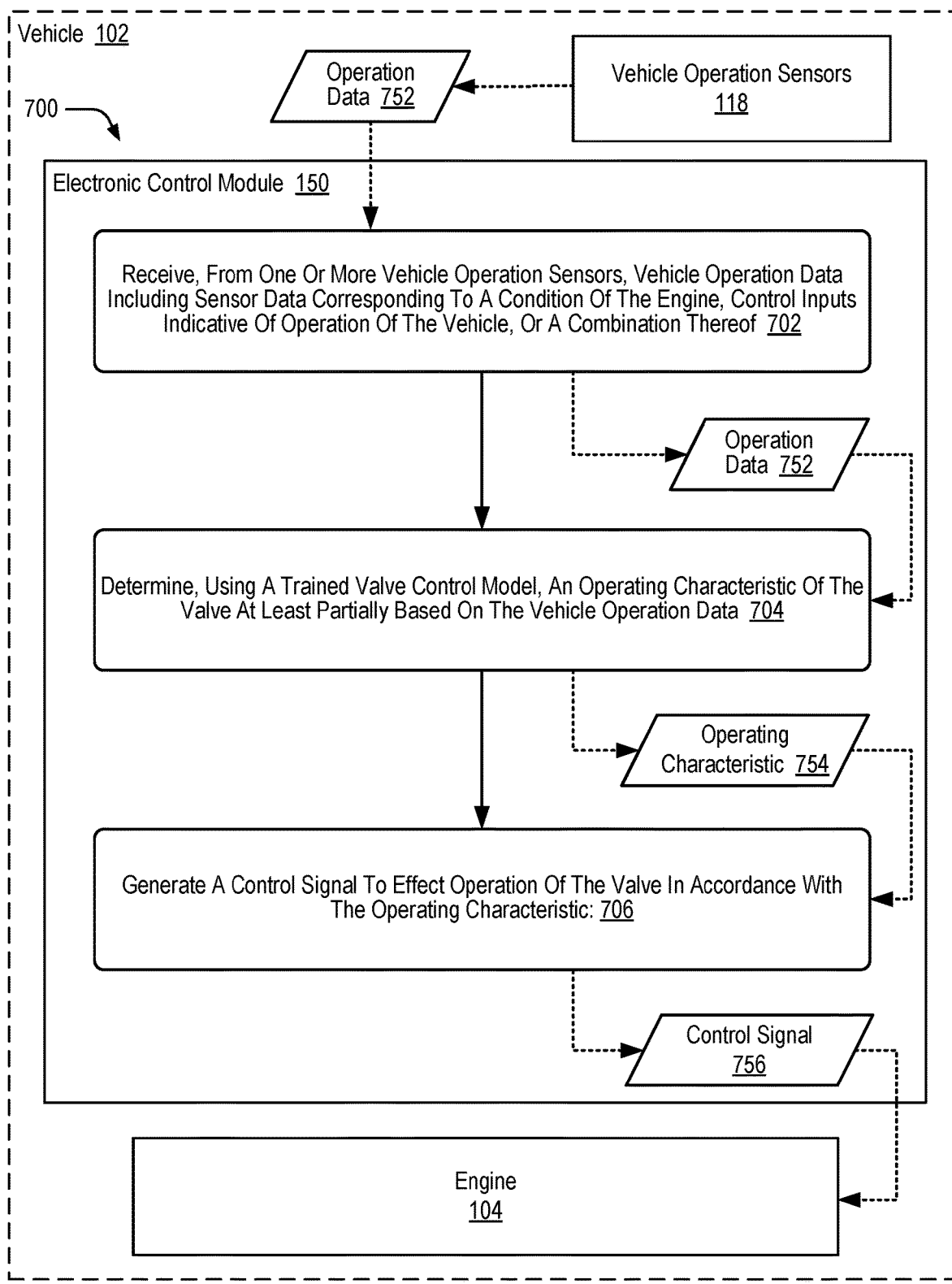
FIG. 7 is a flow chart of a method of controlling an electronically controllable valve of an engine of a vehicle in accordance with some examples of the present disclosure.
Figure 8:
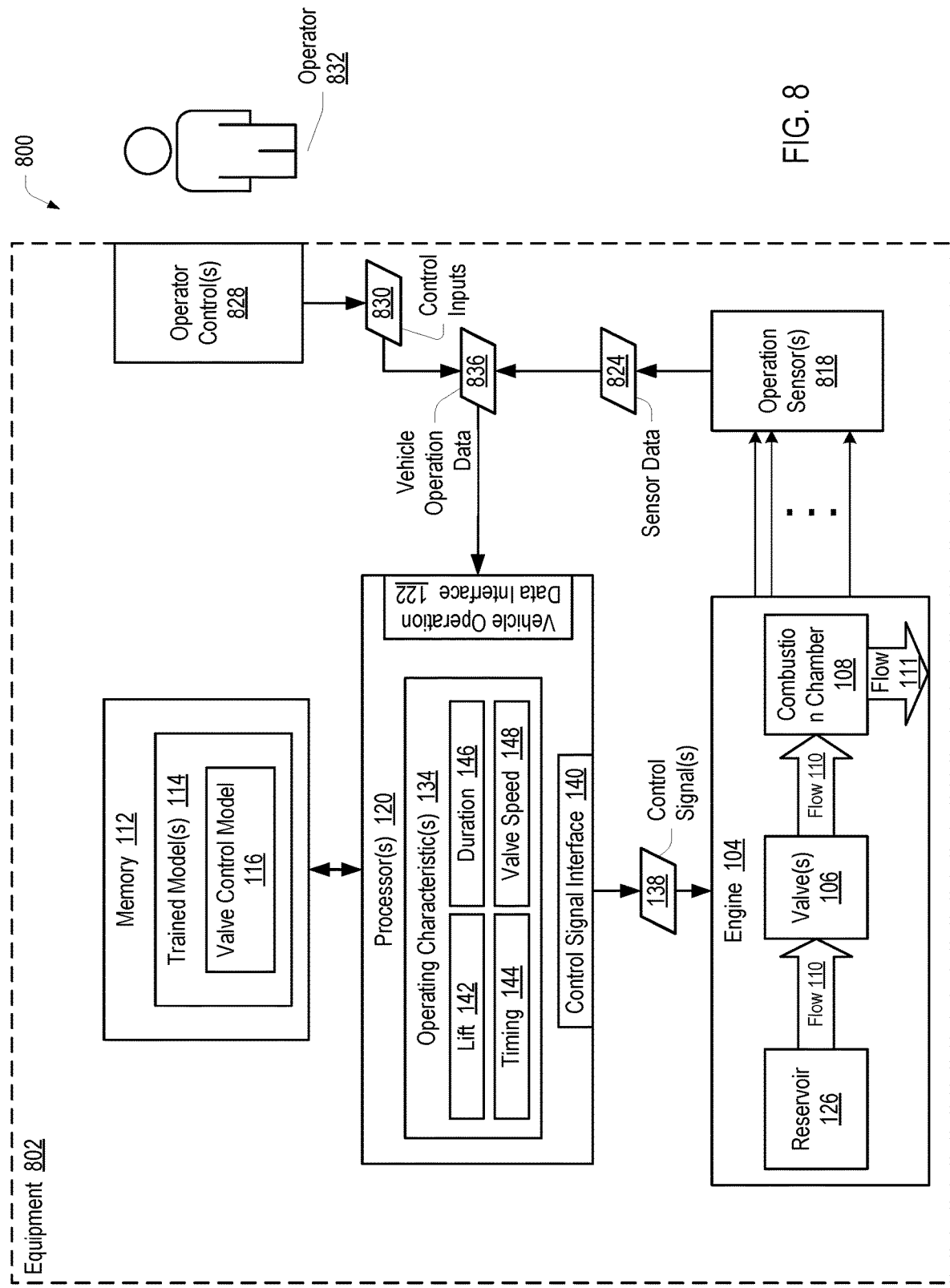
FIG. 8 illustrates a block diagram of an implementation of equipment that includes a valve control model to control operation of an electronically controllable valve of an engine in accordance with some examples of the present disclosure.

Readers will appreciate that in some embodiments the ECMs described above may be used with combustion engines in embodiments where a hybrid vehicle includes a combustion engine and an electric motor, which will be described below with reference to FIGS. 7-9. For further explanation, FIG. 7 therefore depicts a flowchart (700) of a method of controlling an electronically controllable valve of an engine of a vehicle. In accordance with a particular implementation, the method is performed by the vehicle (102), such as by the one or more processors (120) in the ECM (150) of FIG. 1.

In this example, the method includes: receiving (702), from one or more vehicle operation sensors, vehicle operation data (752) including sensor data corresponding to a condition of the engine, control inputs indicative of operation of the vehicle, or a combination thereof. For example, the one or more processors (120) receive the vehicle operation data (136) from sensors at the operator controls 128, from the vehicle operation sensor(s) 118, or a combination thereof.

The example method also includes determining (704), using a trained valve control model, an operating characteristic (754) of the valve at least partially based on the vehicle operation data (752). For example, as described above with reference to FIG. 1, the one or more processors (120) may determine (704) the operating characteristic (754) of the electronically controllable valve (106) at least partially based on a valve control model, such as motor control model (116).

The method also includes generating (706) a control signal (756) to adjust operation of the valve in accordance with the operating characteristic (754). For example, as described above with reference to FIG. 1, the one or more processors (120) may generate the control signal (756) to control operation of the electronically controllable valve 106 in accordance with the operating characteristic (134).

In some implementations, receiving (702) operation data (752) may include receiving from one or more travel condition sensors, travel sensor data corresponding to a travel condition and determining, using a travel type model, a travel type based on the travel sensor data. For example, the travel sensor data (216) is received from the travel condition sensor(s) (210), and the travel type model (202) is used to determine the travel type (220). In such implementations, the operating characteristic (134) is determined further based on the travel type (220).

In some implementations, determining (704) an operating characteristic (754) may include using a trained operator type model, preference data corresponding to an operator of the vehicle. For example, the operator type model (204) is responsive to operator data (238) to generate the preference data (222). In such implementations, the operating characteristic (134) is determined further based on the preference data (222).

In some implementations, receiving (702) operation data (752) may include receiving a fleet control instruction and determining, using a fleet operation model, fleet operation data corresponding to a fleet control instruction that is received at the vehicle. For example, the fleet operation model (206) is responsive to the fleet control data (218) that may be an instruction to generate the fleet operation data (224). In such implementations, the operating characteristic (134) is determined further based on the fleet operation data (224).

Although the preceding description describes implementations in which the electric motor (104) is in a vehicle, in other implementations the electric motor (104) is instead used in conjunction with other equipment, such as part of a power generator or other non-transportation equipment. FIG. 8 depicts a system (800) in which the memory (112), the one or more processors (120), and the electric motor (104) are components of equipment (802). The one or more processors (120) receive operation data (836) that includes sensor data (824) from one or more operation sensors (818) and control inputs (830) corresponding to manipulation of one or more operator controls (828) via an operator (832) of the equipment (802). Thus, it can be seen that the system (100) of FIG. 1 corresponds to a particular implementation of the system (800) in which the equipment (802) is a vehicle, although the system (800) is not limited to embodiments in which the equipment (802) is a vehicle.

Figure 9:
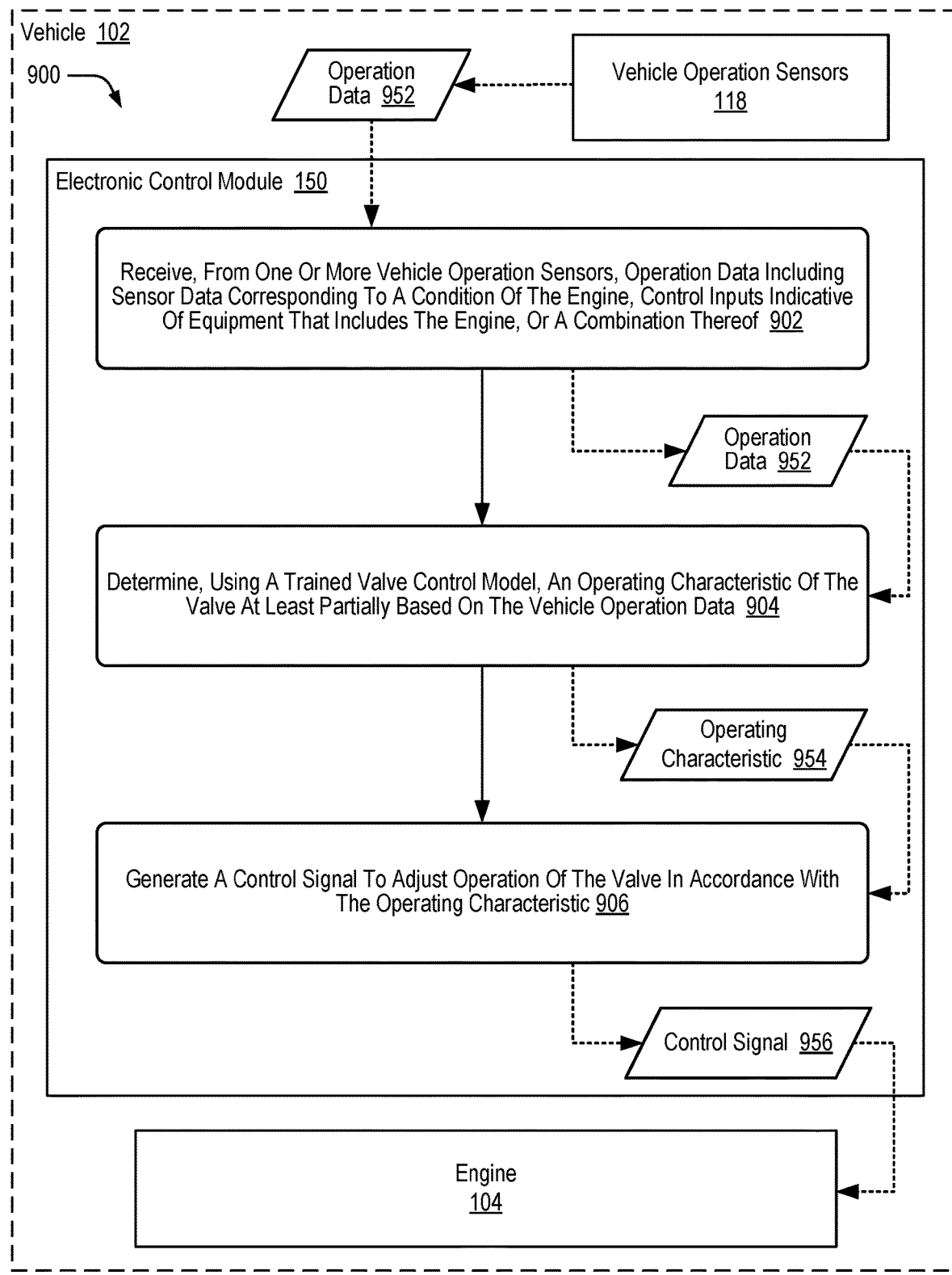
FIG. 9 is a flow chart of a method of controlling an electronically controllable valve of an engine in accordance with some examples of the present disclosure.

For further explanation, FIG. 9 depicts a flowchart (900) of a method of controlling an electronically controllable valve of an engine. In accordance with a particular implementation, the method (900) is performed by the one or more processors (120) of FIG. 8 implemented in non-transportation equipment.

The method includes receiving (902), from one or more operation sensors (118), operation data (952) including sensor data corresponding to a condition of the electric motor (104), control inputs indicative of operation of the equipment that includes the engine, or a combination thereof. For example, as described above with reference to FIG. 8, the one or more processors (120) receive the operation data (836) from sensors at the operator controls (828), from the operation sensor(s) (818), or a combination thereof.

The method (900) also includes determining (904), using a trained valve control model, an operating characteristic (954) of the valve at least partially based on the operation data (952). For example, as described above with reference to FIG. 8, the one or more processors (120) determine the operating characteristic (134) of the electronically controllable valve (106) at least partially based on the motor control model (116).

The method (900) also includes generating (906) a control signal (956) to adjust operation of the electronically controllable valve (106) in accordance with the operating characteristic (954). For example, as described above with reference to FIG. 8, the one or more processors (120) generate a control signal (838) to control operation of the electronically controllable valve (106) in accordance with the operating characteristic (134).

Figure 10:
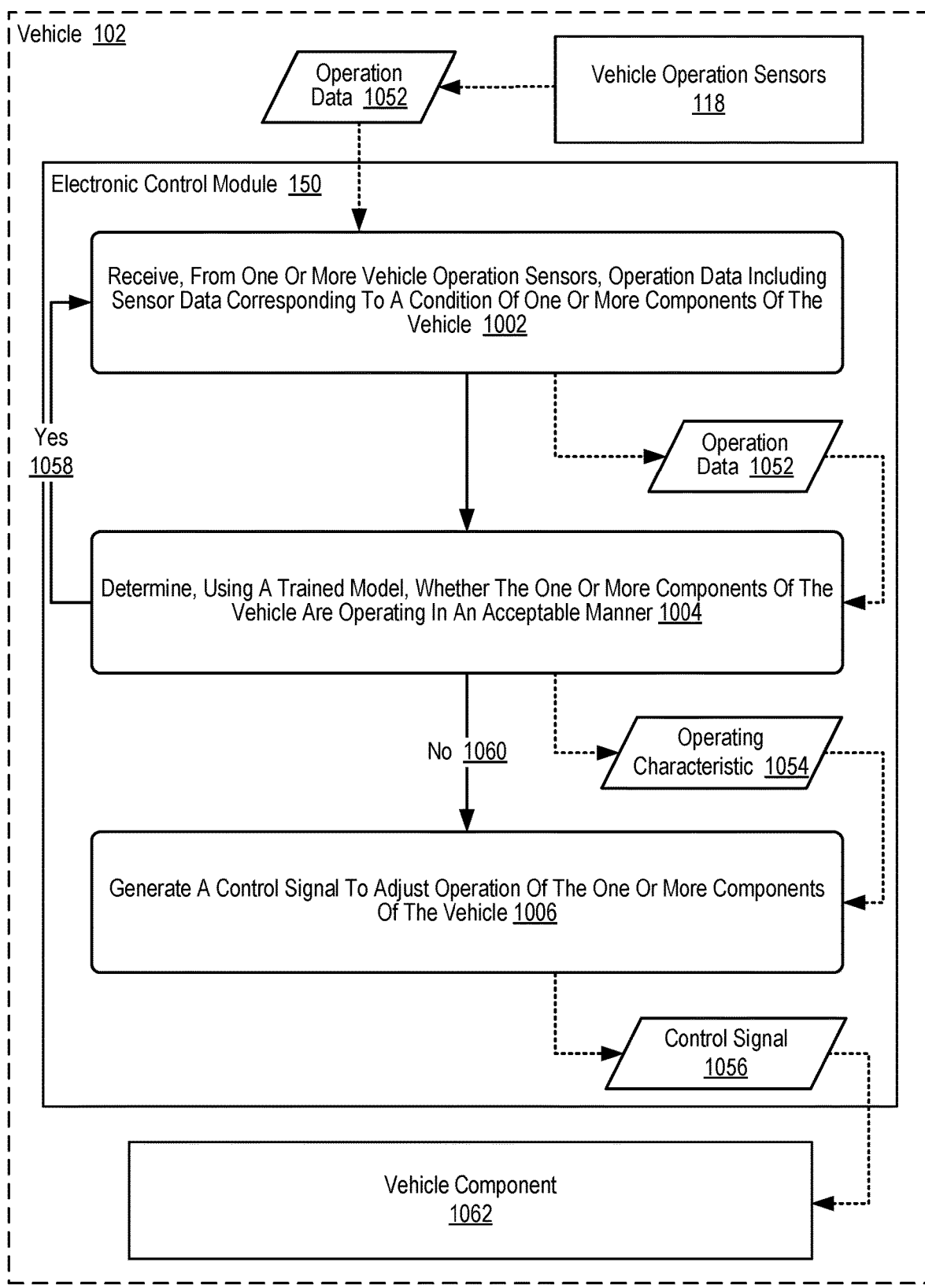
FIG. 10 sets forth a flowchart illustrating an example method of controlling the operation of a component in an electric vehicle in accordance with some embodiments of the present disclosure.

For further explanation, FIG. 10 sets forth a flowchart illustrating an example method of controlling the operation of a component in an electric vehicle (102) in accordance with some embodiments of the present disclosure. In some aspects, the example method of FIG. 10 illustrates examples of applying artificial intelligence at an electric or hybrid electric vehicle for automated actuation of mechanical or electromechanical components, improved battery safety, or both. In accordance with a particular implementation, the method is performed by the one or more processors (120) of FIG. 8 implemented in non-transportation equipment, whereas in other embodiments the method may be performed by an on-board ECM (150) that is included within the vehicle (102) itself.

The method includes receiving (1002), from one or more operation sensors (118), operation data (1052) including sensor data corresponding to a condition of one or more components (1062) of an electric vehicle (102). The one or more components (1062) of an electric vehicle (102) may be embodied, for example, as the battery of the vehicle (102), as a portion of the battery such as one or more cells of the battery, as the electric motor of the vehicle (102), as one or more chargers of the vehicle, or as any other combination of components that collectively form the electric vehicle (102).

Consider an example in which the operation sensors (118) are embodied as thermal sensors that are configured to measure thermal characteristics of one or more battery cells in the battery of the electric vehicle (102). In such an example, the operation sensors (118) may be communicatively coupled to a physical or virtual machine that is supporting the execution of the ECM (150), including one or more trained models that are being executed. In such an example, the operation sensors may periodically send (or the ECM (150) may periodically request) operation data (1052) that includes the thermal characteristics of the one or more battery cells in the battery of the electric vehicle (102). As described below, such operation data (1052) may be used to control one or more operational aspects of the electric vehicle (102).

The method depicted in FIG. 10 also includes determining (1004), using a trained model, whether the one or more components (1062) of the electric vehicle (102) are operating in an acceptable manner at least partially based on the operation data (1052). For example, the trained model may be configured such that certain thermal characteristics, alone or in combination with other operating data (1052), are indicative that a battery or one or more cells of such a battery, are operating in accordance with a profile for batteries that tend to catch fire, explode, or are otherwise dangerous. In such an example, the trained model may determine (1004) that the battery is not (1060) operating in an acceptable manner.

In another example, determining (1004), using a trained model, whether the one or more components (1062) of the electric vehicle (102) are operating in an acceptable manner at least partially based on the operation data (1052) may be carried out to identify components that are not operating in an optimal, near-optimal, or other manner that satisfies a target threshold. For example, the operation data (1052) may reveal that the electric motor is operating at 60% of its load whereas the optimal or target load for the electric motor is achieved when the electric motor is operating at 75% of its load. Likewise, the operation data (1052) may reveal that while battery usage and the current operating characteristics of the battery do not create a dangerous situation, battery usage and the current operating characteristics of the battery may indicate that the battery is being utilized in a manner that causes battery life to be reduced at a rate that exceeds or satisfies a predetermined threshold. For example, while any operation of the vehicle (102) (including very efficient operation of the vehicle) may cause battery life to be reduced, reducing battery life at a rate that exceeds or satisfies a predetermined threshold may be flagged such that vehicle operation can be adjusted, as explained in greater detail above and below. Readers will appreciate that determining (1004), using a trained model, whether the one or more components (1062) of the electric vehicle (102) are operating in an acceptable manner at least partially based on the operation data (1052) can therefore include determining whether the one or more components are operating in a potentially dangerous manner, determining whether the one or more components are operating in an inefficient manner, determining whether the one or more components are operating in a manner that can reduce the expected life of one or more components in the vehicle, and so on.

Readers will appreciate that although the example described here relates to a binary decision in which the one or more components (1062) of the electric vehicle (102) are either affirmatively (1058) determined to be operating in an acceptable manner or determined to not (1060) be operating in an acceptable manner, an implementation with a binary decision is only used for ease of explanation and does not represent a limitation of possible embodiments. In other embodiments, for example, the trained model may determine that a particular component is operating in a manner that is best associated with one of many profiles (e.g., a 'healthy' profile, a 'healthy but not optimal' profile, a 'needs attention' profile, a 'degraded performance' profile, an 'unhealthy but not dangerous' profile), where each of the profiles are associated with a corresponding action that should be taken. The corresponding action could include, for example, taking no action, issuing a warning, scheduling maintenance, limiting the operation of the vehicle (e.g., setting a top speed of X miles/hour), reducing the functionality of the vehicle (e.g., disabling the stereo system), preventing operation of the vehicle, and so on.

The method depicted in FIG. 10 also includes generating (1006) a control signal (1056) to adjust operation of the one or more components (1062) of the electric vehicle (102). Although the example depicted in FIG. 10 illustrates an example in which a control signal is generated (1006) to adjust the operation of the one or more components (1062) for which operation data (1052) was received (1002), in other embodiments, the components for which operation data (1052) was received (1002) and the components whose operation will be effected by the generation of a control signal (1056) may be distinct. For example, receiving operation data (1052) associated with a battery may cause a control signal to be generated (1006) that restricts the operation of the electric motor.

As mentioned above, for example, an action to be taken in response to detecting that one or more components of the vehicle (102) are operating in a particular way can include generating a notification. In such an example, generating (1006) a control signal (1056) to adjust operation of the one or more components (1062) of the electric vehicle (102) can include generating a control signal that causes an in-dash component, portion of an entertainment system, portion of a notification system, or some other component of the vehicle to deliver a notification via natural language presentation. For example, when a predictive maintenance situation is detected for a battery of the vehicle (102), an owner, driver, or other user of the vehicle (102) can be notified using natural language. In some cases, the notification may indicate that a "protective" profile has been automatically applied and vehicle (102) has been adjusted (e.g., curbed) such that performance that would otherwise be acceptable, would be risky given the predictive maintenance situation. Such an adjustment to the vehicle (102) may be carried out, for example, by generating (1006) a control signal (1056) to adjust operation of the one or more components (1062) of the electric vehicle (102) that cause vehicle performance to be adjusted. In some embodiments, a user of the vehicle (102) (e.g., a driver, a passenger, a pilot, a remote operator) may be allowed to override the performance curbing.

In other embodiments, information that is unrelated to operating data (1052) of the vehicle (102) may be utilized at least in part to generate (1006) a control signal (1056) to adjust operation of the one or more components (1062) of the electric vehicle (102). Consider an example in which operating data (1052) associated with the vehicle (102) indicates that the battery only has sufficient charge to power the vehicle for an expected range (e.g., 10 miles). Alternatively, an AI model may receive the operating conditions, a previous predicted range, and/or other data as input, and may output a predicted remaining range of the vehicle. Such a model may be trained, for example, based on historical range data associated with the vehicle and/or associated with other vehicles having similar characteristics. If the ECM (150) for the vehicle (102) determines, based on GPS data and map data that are unrelated to operating data (1052) of the vehicle (102), that there is no charger (which may be owned by the owner of the vehicle, may be at a public charging station, etc.) within the expected range, the vehicle (102) may determine how much additional range the vehicle (102) would be needed to reach the closest charger. If an adjusted (e.g., curbed) performance profile is expected to provide that additional range, the user may be notified and/or the adjusted profile may be automatically applied. The adjusted profile may, for example, cause the usage of the entertainment system to be limited in order to conserve battery power, cause the usage of a climate control system to be limited in order to conserve battery power, may limit the rate at which the vehicle can accelerate in order to conserve battery power, may change the extent to which autonomous driving features are be utilized to conserve battery power, or other alterations to the operation of the vehicle (102) may be made to conserve battery power. However, even if no available performance profile is expected to provide the additional range, the ECM (150) can be configured to recommend additional solutions. To illustrate, tire pressure models may indicate that adding 3 psi to each tire in the vehicle will provide the required additional 5 miles of range. Such tire pressure models may be available from a tire vendor or may be trained based on historical tire pressure, tire age, and range data associated with the vehicle and/or with other similar vehicles running on similar tires. The vehicle may notify (e.g., via audio and/or visual messages) the user of the recommendation that the user stop at gas station (which is within the expected range of the vehicle) and add a least a certain amount of air to the tires. As yet another example, certain vehicles (102) may have retractable roofs, spoilers, or other drag/friction-adjustment devices, and output from trained models executing as part of the ECM (150) could be used to trigger drag/friction-related advisory notifications to extend range in the case of emergency. Drag/friction-related AI models may be generated by manufacturer of the vehicle using data collecting wind tunnel tests and track tests, may be generated based on historical data associated with the vehicle and/or similar vehicles, etc. Similarly, advisory notifications may be provided for turning down climate control, lights, or other electronic device power consumption within the vehicle (102).

As an example in which the method depicted in FIG. 10 is carried out, consider an example in which the battery cells of an electric vehicle fall into a state of "bad" health. In some cases, such cells should not reach a certain temperature, because there is risk of explosion or other adverse event. Moreover, in some cases even trying to charge a faulty cell can result in a dangerous thermal runaway situation. In order to avoid this dangerous situation, the vehicle (102) may include multiple thermal sensors that are disposed in or near the battery packs of the vehicle (102). In such an example, AI techniques can be used to correlate temperature data to profiles, and, when certain profiles are detected, automatic safety actions can be performed, such as disconnecting a particular battery or cell thereof. For example, when receiving (1002), from one or more operation sensors (118), operation data (1052) including sensor data corresponding to a condition of one or more components (1062) of an electric vehicle (102), thermal information related to the batteries may be received. After receiving such thermal information, a trained model may determine (1004) that the battery of the electric vehicle (102) is not operating in an acceptable manner and a control signal (1056) to adjust operation of one or more components (1062) of the electric vehicle (102) may be generated (1006) to disconnect the battery or the compromised portion thereof. A trained model that is used to make such a determination (1004) may be available from a battery vendor or may be trained based on historical battery usage, battery age, thermal data, or other data associated with the battery and/or with other similar batteries. Such a disconnection may be achieved through the usage of a switchable battery fabric that can be used to connect and disconnect portions of the battery energy consuming components of the vehicle (102) such as the electric motor. Alternatively, even in the case where a full switchable battery fabric is unavailable, vehicle performance can be automatically adjusted so to avoid the chances of reaching a profile that will be dangerous because of faulty battery or battery cell.

As an example in which the method depicted in FIG. 10 is carried out, consider an example in which the vehicle (102) is operating in an "eco" mode. In such an example, machine learning techniques may be used to utilize information regarding the operation of one or more vehicles as training data to learn about patterns of acceleration, speed, braking, and other vehicle operation that were correlated with the improved battery lifetime. After deploying such a trained model on the vehicle (102), operation data (1052) may be received (1002) from one or more operation sensors describing how the vehicle (102) is being accelerated, what speeds the vehicle is operating at, and how the brakes are being applied to determine that the braking system, electric motor, and other components are not operating in an acceptable manner (i.e., not operating in a way that maximizes, nearly-maximizes, or otherwise improves battery life). In such an example, a control signal (1056) to adjust operation of one or more components (1062) of the electric vehicle (102) may be generated (1006) to adjust vehicle operation to be more commensurate recommended acceleration, speed, and braking patterns that the trained model has associated with prolonged battery life.

In some embodiments of the present disclosure, an electric vehicle battery gig economy and energy exchange may be created using vehicles that are similar to the vehicles described above. In such an example, an electric vehicle may mark (i.e., indicate their presence or availability, for example, via a mobile application) at a retail establishment or some other location, and a user may use a mobile device to indicate that the energy equivalent to 100 miles of range is available for sale. A second user in a second electric vehicle may subsequently buy the offered energy and may be provided an authorization mechanism (e.g., a unique code) that enables transfer of only that much energy between the electric vehicles. At scale implementation of such an energy exchange may enable vehicles with larger batteries (e.g., fleet trucks) to monetize excess energy, even while parked.

In some examples, cryptocurrency could be used to facilitate energy exchange. For example, a "ChargeCoin" useable only for charging up electric vehicle batteries could be traded or exchanged like other cryptocurrency. In alternative embodiments, other forms of traditional currency or cryptocurrency could be utilized to facilitate transactions. A gig economy aspect of such an example could involve certain users equipping extra energy in their electric vehicles and potentially driving around specific areas providing energy on demand.

Figure 11:
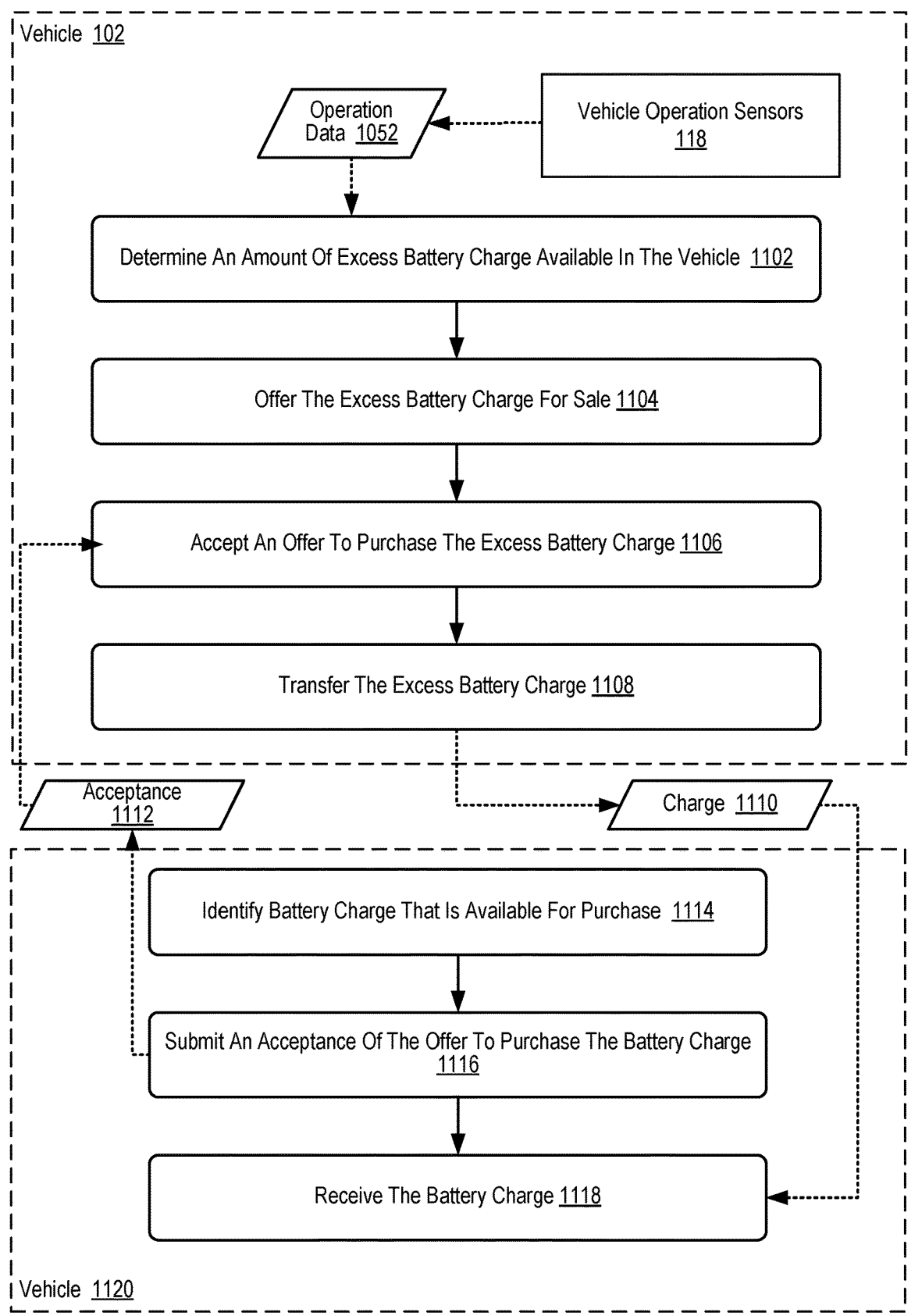
FIG. 11 sets forth a flowchart illustrating an example method of facilitating an energy exchange in accordance with some embodiments of the present disclosure.

For further explanation, FIG. 11 therefore sets forth a flowchart illustrating an example method of facilitating an energy exchange in accordance with some embodiments of the present disclosure. The example method depicted in FIG. 11 includes determining (1102) an amount of excess battery charge available in a vehicle (102). Determining (1102) an amount of excess battery charge available in a vehicle (102) may be carried out, for example, by receiving operation data (1052) such as the current amount of charge in one or more batteries of the vehicle (102) from one or more operational sensors (118). In such an example, the amount of 'excess' battery charge available in a vehicle (102) may represent the difference between the current amount of charge in one or more batteries of the vehicle (102) and the amount of charge that is "needed" by the vehicle (102).

Consider an example in which the current amount of charge in one or more batteries of the vehicle (102) is sufficient to provide the vehicle (102) with 200 miles of driving range, but the vehicle (102) is only 10 miles away from its destination. In such an example, the amount of 'excess' battery charge available in a vehicle (102) may be the amount of charge needed for the vehicle to travel 190 miles, although in other embodiments some reserve charge may be retained by the vehicle (102), thereby reducing the amount of 'excess' battery charge available in a vehicle (102). Readers will appreciate that a determination that a vehicle is only 10 miles away from its destination may be made in a variety of ways. For example, a GPS plotted route/trip may be analyzed to determine the remaining distance to the destination, a meeting's location on user's calendar may be utilized to determine the distance between the user's current location and the meeting's location, a reservation that a user may have made at a restaurant may be used to determine the distance between the user's current location and the restaurant, tickets that a user may have to a sporting event that is known to start at a certain time may be used to determine the distance between the user's current location and the location of the sporting event, and so on.

The example method depicted in FIG. 11 also includes offering (1104) the excess battery charge for sale. Offering (1104) the excess battery charge for sale may be carried out, for example, by posting the excess battery charge for sale on an energy exchange marketplace. The energy exchange marketplace may be embodied, for example, as a platform for connecting sellers of energy to buyers of energy. In such an example, each buyer or seller may create an account on the energy exchange marketplace, and may post offerings of energy to be sold, browse offerings of energy that are for sale, and carry out the various permutations of the offer and acceptance process to facilitate the sale and purchase of energy. In such an example, the energy exchange marketplace may include information associated with each seller and buyer such as, for example, the location of each participant in the transaction, a price that the participant is willing to buy or sell energy at, information describing the buyer or sellers equipment and capabilities that are to be used to exchange energy, and much more. For example, the energy exchange marketplace may also facilitate energy exchange transactions as the energy exchange marketplace may include payment mechanisms for each participant. In such an example, each participant in the energy exchange marketplace may have an instance of the energy exchange marketplace application installed on their mobile device, installed on a user interface provided by the vehicle (102) itself, or may otherwise access the energy exchange marketplace (e.g., via accessing a URL associated with the energy exchange marketplace in a web browser). As such, although the example depicted in FIG. 11 illustrates an embodiment where the vehicles themselves are performing the described steps, in other embodiments all or some of the steps performed to facilitate an energy exchange in accordance with some embodiments of the present disclosure may be carried out by some other actor (e.g., one or more smartphones, by software executing on a server, by software executing in a cloud environment).

The example method depicted in FIG. 11 also includes accepting (1106) an offer to purchase the excess battery charge. Accepting (1106) an offer to purchase the excess battery charge may be carried out, for example, by receiving an indication through the energy exchange marketplace that another user has accepted the terms that the excess energy is offered by a user associated with the vehicle (102) that has excess energy to sell, by a user associated with the vehicle (102) that has excess energy to sell accepting the proposed terms offered by another user of the energy exchange marketplace, or in some other way. In the example method depicted in FIG. 11, another vehicle (1120) or a user (e.g., a driver) associated with such a vehicle (1120) may identify (1114) battery charge that is available for purchase and may subsequently submit (1116) an acceptance (1112) of the offer to purchase the battery charge through the energy exchange marketplace.

The example method depicted in FIG. 11 also includes transferring (1108) the excess battery charge (1110). Transferring (1108) the excess battery charge (1110) may be carried out, for example, through the use of Peer-to-Peer Car Charging ('P2C2') technologies that may involve special cabling or similar equipment between a charging port of the electric vehicle (1120) that is receiving battery charge (1110) and the vehicle (102) that is selling its excess battery charge, where the vehicle (102) that is selling its excess battery charge may be equipped with vehicle-to-everything ('V2X') capabilities for providing electricity to homes, buildings, and even other electric vehicles. Alternatively, transferring (1108) the excess battery charge (1110) through the use of special purpose equipment such as a dedicated charging station that can accept a charge from the vehicle (102) that is selling its excess battery charge and subsequently deliver such charge to the electric vehicle (1120) that is receiving battery charge (1110), where the vehicle (102) that is selling its excess battery charge may be equipped with vehicle-to-grid ('V2G') capabilities for returning charge to the grid. In fact, in some embodiments a vehicle (102) may sell its excess battery charge in order to take advantage of rewards programs, discounts, or other incentives. For example, a vehicle may transfer its excess charge to a package delivery drone in exchange for a discount by an online retailer. In other embodiments, transferring (1108) the excess battery charge (1110) may be carried out in other ways. In the example depicted in FIG. 11, the other vehicle (1120) may therefore receive (1118) the battery charge (1110).

Although the example described above relates to an embodiment where a vehicle (102) is depicted as performing the steps of determining (1102) an amount of excess battery charge available in a vehicle (102), offering (1104) the excess battery charge for sale, accepting (1106) an offer to purchase the excess battery charge, and transferring (1108) the excess battery charge (1110), in other embodiments such steps may be performed by a different combination of actors. For example, in some embodiments a mobile application, energy exchange platform, or some other entity may perform the steps of offering (1104) the excess battery charge for sale and accepting (1106) an offer to purchase the excess battery charge, whereas components within the vehicle may be used to determine (1102) an amount of excess battery charge available in a vehicle (102) and transfer (1108) the excess battery charge (1110). As such, in some embodiments the mobile application, energy exchange platform, or some other entity may also perform some combination of receiving an indication of the excess charge available in a particular vehicle, offering (1104) the excess battery charge for sale, receiving an acceptance of the offer to purchase the excess battery charge, receiving a counteroffer to the offer to purchase the excess battery charge, presenting the counteroffer to purchase the excess battery charge, receiving an acceptance of the counteroffer, receiving a counteroffer to the counteroffer to purchase the excess battery charge, presenting the counteroffer to the counteroffer, receiving and processing payment information, and so on, That is, the mobile application, energy exchange platform, or other entity may perform the tasks associated with initiating and facilitating energy exchange transactions, while not being involved in the actual determinations as to how much excess battery charge is available in a vehicle (102) or the actual transfer (1108) of the excess battery charge (1110).

Although the examples described above relate to embodiments where a vehicle (102) sells its excess charge, in other embodiments the vehicles that are selling charge to other vehicles may be embodied differently. For example, the vehicle (102) that is selling charge may be embodied as a truck, car, or some other form of a mobile charging station that has charged batteries that are utilized to sell electrical charge to other vehicles. In other embodiments, the truck, car, or some other form of a mobile charging station may include one or more generators for generating electrical charge that can be sold, special purpose equipment for transferring power from the grid to other vehicles, and so on.

In some embodiments, a truck, car, or some other form of a mobile charging station that has electrical charge that can be delivered to one or more electric vehicles may be deployed in a predictive manner. In such embodiments, location and trip data from navigation applications or other sources may be aggregated for the purposes of enabling analysis of macro travel patterns. Based on this information, mobile charge points can be deployed to strategic locations where increased demand is forecasted. In such embodiments, not only can data from vehicles or data from navigation applications be used, but other sources of data may also be factored into algorithms for forecasting increased demand. For example, social media posts may be leveraged to forecast demand hot spots.

Figure 12:
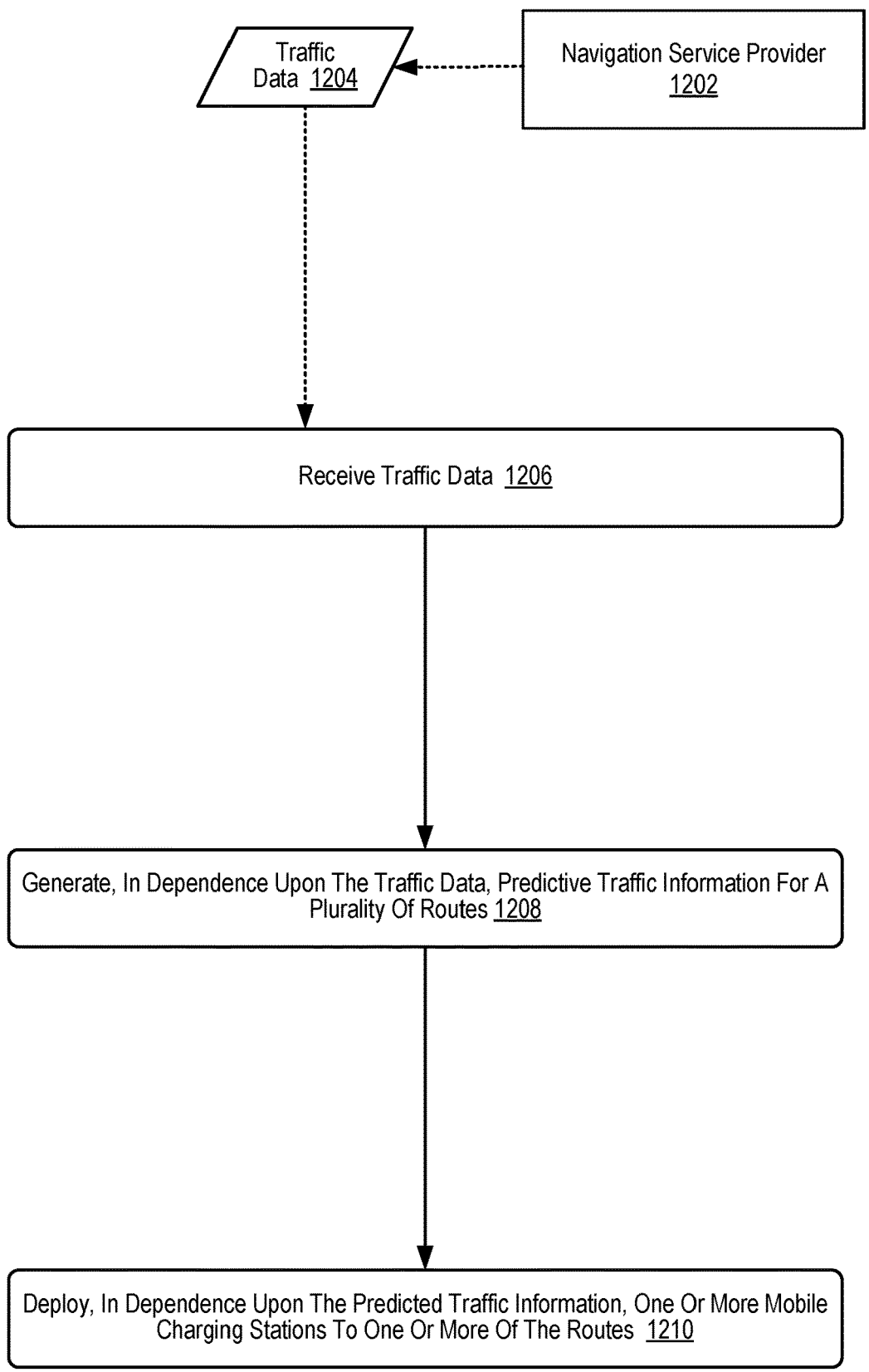
FIG. 12 sets forth a flowchart illustrating an example method of deploying mobile charging stations using predictive traffic information in accordance with some embodiments of the present disclosure.

For further explanation, FIG. 12 therefore sets forth a flowchart illustrating an example method of deploying mobile charging stations using predictive traffic information in accordance with some embodiments of the present disclosure. Although not explicitly depicted in FIG. 12, the steps depicted in FIG. 12 (as well as those described herein) may be carried out by one or more modules of computer software executing on physical or virtualized computer hardware/virtualized execution environments. For example, the steps described herein may be carried out by a software application that is executing within the vehicle itself, the steps described herein may be carried out by a software application that is executing in a cloud environment that is in communications with the vehicle, the steps described herein may be carried out by a software application that is executing within a mobile device of a vehicle user (e.g., a passenger, a driver, a pilot, an operator), or the steps described herein may be carried out by a software application that is executing elsewhere, including combinations the environments described above.

The example method depicted in FIG. 12 includes receiving (1206) traffic data. The traffic data may include information describing, for example, macro-level traffic patterns such as an estimate or actual count of the number of vehicles that were on a particular route (e.g., a portion of a particular roadway) at a particular time, information describing the congestion level of a particular route at a particular time, information describing the speed at which one or more vehicles were or were estimated to be moving on a particular route at a particular time, and other information that explicitly describes or can be used to infer how many vehicles were travelling along a particular route at a particular time. In fact, such information can be used to infer a generalized version of how many vehicles were travelling along a particular route at a particular time (e.g., the route was 'heavily trafficked,' moderately trafficked,' or 'lightly trafficked').

In the example method depicted in FIG. 12, traffic data is received (1206) from a navigation service provider (1202). The navigation service provider (1202) may be embodied, for example, as a platform such as Waze™, Google™ Maps, or other platform that collects map data, travel times, traffic information, and other information from users for analysis. In other embodiments, the traffic data may be obtained in other ways including through the use of proprietary tools or by accessing other sources of such traffic data. Additional, fewer, and/or different data sources may be used in alternative embodiments.

The example method depicted in FIG. 12 includes generating (1208), in dependence upon the traffic data, predicted traffic information for a plurality of routes. The predicted traffic information for a plurality of routes may be embodied, for example, as information that is describing the anticipated state of traffic on a particular route at a particular time in the future. For example, predicted traffic information for afternoon traffic on a set of routes may be generated in the morning before the actual state of traffic on each route is actually known. In the example method depicted in FIG. 12, a trained model may be responsible for generating (1208) the predicted traffic information for a plurality of routes. Machine learning techniques may be utilized to generate and train the model, for example, by providing traffic data that was collected over time to the model as training data. In such a way, a model may be generated that can accurately predict traffic data for the plurality of routes.

The example method depicted in FIG. 12 includes deploying (1210), in dependence upon the predicted traffic information, one or more mobile charging stations to one or more of the routes. Deploying (1210) one or more mobile charging stations to one or more of the routes in dependence upon the predicted traffic information may be carried out, for example, by deploying the one or more mobile charging stations to the most heavily trafficked routes under the assumption that the presence of a larger number of cars would result in a higher demand for purchasing energy from the mobile charging stations.

Readers will appreciate that while the predicted traffic information may be used as an input for determining where the one or more mobile charging stations should be deployed (1210), such a determination may ultimately be made in such a way where the predicted traffic information is just one of many factors that are taken into consideration. For example, the presence (or lack thereof) of other charging stations mobile or immobile may be taken into consideration as a particular route, while heavily saturated with traffic, also has a large number of charging stations along the route that would provide competition for any mobile charging stations that were deployed (1210) along the route. The presence of other charging stations may be a relatively static variable when taking into consideration only permanent, immobile charging stations into consideration. In other embodiments, however, the presence of other charging stations may be a more dynamic variable when taking into account the presence of other mobile charging stations. In such an example, real-time or nearly real-time analysis may be performed to identify other cars, trucks, or other forms of mobile charging station that are located on a particular route and offering electrical charge for sale. Such information may be obtained, for example, from an energy exchange marketplace as described above or from some other source.

In the example depicted in FIG. 12, deploying (1210) one or more mobile charging stations to one or more of the routes in dependence upon the predicted traffic information may be carried out, for example, by instructing or otherwise causing the mobile charging station to be positioned on the appropriate route, especially when movement of the mobile charging station is carried out autonomously by self-driving vehicles or similar mechanism. In other embodiments, deploying (1210) one or more mobile charging stations to one or more of the routes in dependence upon the predicted traffic information may be carried out, for example, by presenting information (e.g., a recommendation) to a driver or other operator of a mobile charging station that the driver can use to appropriately position the mobile charging station along the appropriate route.

In the various embodiments described above in which energy is bought and sold through an energy exchange marketplace or other mechanism, a rewards program may be implemented for buyers and sellers of energy. Such a rewards program could include a variety of features including, for example, providing monetary incentive or other form of reward for purchasing certain amounts of energy, for participating in a certain number of transactions, and so on. In fact, in some embodiments the amount of fossil fuel used and the amount of renewable energy used may be tracked and rewards may be awarded as particular thresholds are met (e.g., a user utilizes more renewable energy than fossil fuel). Such a rewards program may be a feature of the energy exchange marketplace itself, such a rewards program may allow for individual sellers of energy to offer rewards for purchases, or rewards may be administered in some other way. For example, a cheaper "ChargeCoin" cost (or cost payable by other means) may be incurred for a user that elects to charge their batteries by using a renewable energy source. Likewise, a user may more easily mine coin or be awarded coin if they use a green energy source rather than a non-green source. For example, a user that has solar power at their home might generate so much green energy that they are issued enough coins to enable them to charge their vehicle car for free or nearly free. Similarly, if a user's office uses clean energy but their home does not, in some embodiments the vehicle can be used to provide some of the energy that the user's home needs when the vehicle is plugged in at their home. In such an embodiment, a cable connecting the car to the charger at the house may have two-way power transmission capability, so that the vehicle can transfer power to the house via the charger. Limitations may be placed on the extent to which the vehicle transfers power to the house such as, for example, reserving enough charge to get the vehicle back to the office or reserving enough charge in the vehicle to provide the vehicle with a predetermined driving range.

Readers will further appreciate that, as mentioned above, many of the steps described above may involve the interaction of a software application (or other form of computer program instructions) and a user. Such interactions may be facilitated, for example, using interfaces that are provided by the vehicles themselves (e.g., in-dash touchscreen displays, in-dash displays that include input devices located on an operator control such as a steering wheel), including interfaces that leverage natural language processing technologies so that information can be passed to and received from a user using natural language.

The systems and methods illustrated herein may be described in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software, and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

In this written description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements. In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device. As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, from one or more vehicle sensors, sensor data corresponding to a condition of one or more components of a vehicle, wherein the sensor data includes data describing the state of an electric battery in the vehicle;
   determining, using a trained model and based on the state of the electric battery, that an operation of one or more components of the vehicle should be adjusted by determining that the vehicle is operating in a manner that reduces battery life at a rate exceeding a threshold; and
   generating a control signal to adjust the operation of the one or more components of the vehicle.

2. The method of claim 1 wherein receiving, from one or more vehicle operation sensors, operation data including sensor data corresponding to a condition of one or more components of the vehicle further comprises receiving information describing one or more quantifiable metrics associated with the electric battery.

3. The method of claim 1 further comprising determining that the battery is operating in a potentially unsafe manner.

4. The method of claim 1 wherein generating a control signal to adjust operation of the one or more components of the vehicle includes generating a control signal to disconnect one or more portions of the battery.

5. The method of claim 1 wherein generating a control signal to adjust operation of the one or more components of the vehicle includes generating a control signal to alter the operation of a braking system of the vehicle.

6. The method of claim 1 wherein generating a control signal to adjust operation of the one or more components of the vehicle includes generating a control signal to alter the operation of an electric motor of the vehicle.

7. The method of claim 1 wherein the one or more trained models include a motor control model configured to generate output associated with controlling an electric motor.

8. The method of claim 1 wherein the one or more trained models are executing in an electronic control module of the vehicle.

9. The method of claim 1 wherein the vehicle is an electric vehicle that includes an electric motor.

10. The method of claim 1 wherein the vehicle is hybrid vehicle that includes an electric motor and a combustion engine.

11. An apparatus comprising a computer processor and a computer memory, the computer memory including computer program instructions that, when executed by the processor, cause the apparatus to carry out the steps of:
    receiving, from one or more vehicle sensors, sensor data corresponding to a condition of one or more components of a vehicle, wherein the sensor data includes data describing the state of an electric battery in the vehicle;
    determining, using a trained model and based on the state of the electric battery, that an operation of one or more components of the vehicle should be adjusted by determining that the vehicle is operating in a manner that reduces battery life at a rate exceeding a threshold; and
    generating a control signal to adjust the operation of the one or more components of the vehicle.

12. The apparatus of claim 11 further comprising computer program instructions that, when executed by the processor, cause the apparatus to carry out the step of determining that the battery is operating in a potentially unsafe manner.

13. The apparatus of claim 11 wherein generating a control signal to adjust operation of the one or more components of the vehicle includes generating a control signal to disconnect one or more portions of the battery.

14. The apparatus of claim 11 wherein the one or more trained models include a motor control model configured to generate output associated with controlling an electric motor.

15. The apparatus of claim 11 wherein the one or more trained models are executing in an electronic control module of the vehicle.

16. The apparatus of claim 11 wherein the vehicle is an electric vehicle that includes an electric motor.

17. The apparatus of claim 11 wherein the vehicle is hybrid vehicle that includes an electric motor and a combustion engine.

18. A computer program product disposed on a non-transitory computer readable medium, the computer program product including computer program instructions that, when executed, carry out the steps of:
   receiving, from one or more vehicle sensors, sensor data corresponding to a condition of one or more components of a vehicle, wherein the sensor data includes data describing the state of an electric battery in the vehicle;
   determining, using a trained model and based on the state of the electric battery, that an operation of one or more components of the vehicle should be adjusted by determining that the vehicle is operating in a manner that reduces battery life at a rate exceeding a threshold; and
   generating a control signal to adjust the operation of the one or more components of the vehicle.

19. The computer program product of claim 18 wherein receiving, from one or more vehicle operation sensors, operation data including sensor data corresponding to a condition of one or more components of the vehicle further comprises receiving information describing one or more quantifiable metrics associated with the electric battery.

20. The computer program product of claim 18 further comprising computer program instructions that, when executed, carry out the step of determining that the battery is operating in a potentially unsafe manner.

\* \* \* \* \*